US011784406B2

(12) United States Patent
Schneider et al.

(10) Patent No.: US 11,784,406 B2
(45) Date of Patent: Oct. 10, 2023

(54) ARRAYS OF LENS-COUPLED SINGLE-MODE OPTICAL FIBERS FOR CAPTURING RADIO-FREQUENCY SIGNALS IN AN IMAGING PHASED-ARRAY RECEIVER

(71) Applicant: Phase Sensitive Innovations, Inc., Newark, DE (US)

(72) Inventors: Garrett Schneider, New Castle, DE (US); Christopher Schuetz, Avondale, PA (US); Janusz Murakowski, Bear, DE (US); Tom Dillon, Newark, DE (US); Shouyuan Shi, Newark, DE (US); Dennis Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

(21) Appl. No.: 17/523,552

(22) Filed: Nov. 10, 2021

(65) Prior Publication Data
US 2022/0149520 A1     May 12, 2022

Related U.S. Application Data

(63) Continuation of application No. 16/401,072, filed on May 1, 2019, now Pat. No. 11,205,843.

(60) Provisional application No. 62/665,191, filed on May 1, 2018.

(51) Int. Cl.
*H01Q 3/26*     (2006.01)
*H01Q 3/24*     (2006.01)

(52) U.S. Cl.
CPC ................ *H01Q 3/26* (2013.01); *H01Q 3/24* (2013.01)

(58) Field of Classification Search
CPC ...... H01Q 3/2611; H01Q 3/24; G01S 19/246; G01S 19/396
USPC ................ 342/378, 124, 357.59, 369, 352
See application file for complete search history.

(56) References Cited

U.S. PATENT DOCUMENTS

| 2019/0089305 | A1 | 3/2019 | Linn et al. |
| 2019/0296831 | A1* | 9/2019 | Dillon ............... H04B 10/64 |
| 2019/0372219 | A1* | 12/2019 | Schneider ........... G02F 2/004 |

* cited by examiner

*Primary Examiner* — Bo Fan
(74) *Attorney, Agent, or Firm* — Muir Patent Law, PLLC

(57) ABSTRACT

An RF receiver may include antenna elements to receive RF signals, and electro-optic modulators to generate corresponding upconverted optical signals by mixing an RF signal with an optical carrier beam. The RF receiver may include a transmission array having a first bundle of optical waveguides that receive and transmit upconverted optical signals from their ends. The ends may be arranged in a first pattern. The RF receiver may include an interference space to receive the upconverted optical signals to form a composite beam, and an array of single mode optical fibers that have lenses positioned in a detection plane to receive a portion of the composite beam. The first pattern of the ends generates an RF emitter interference pattern at the detection plane, and the single mode optical fiber lenses have a geometric arrangement that corresponds to the first RF emitter interference pattern.

27 Claims, 19 Drawing Sheets

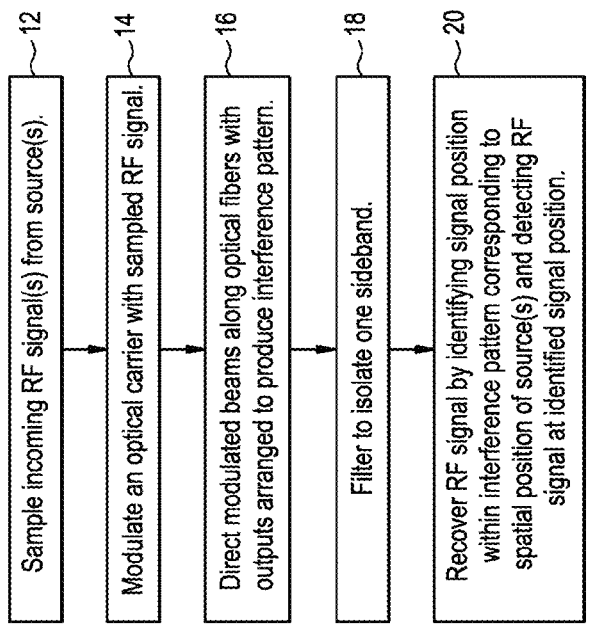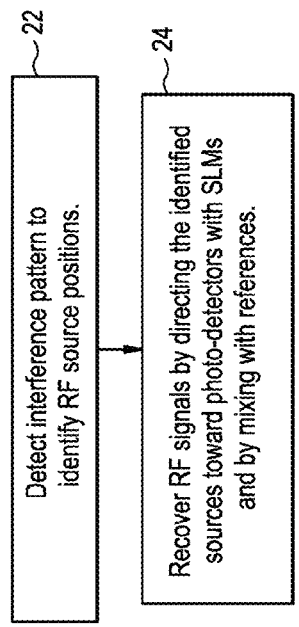

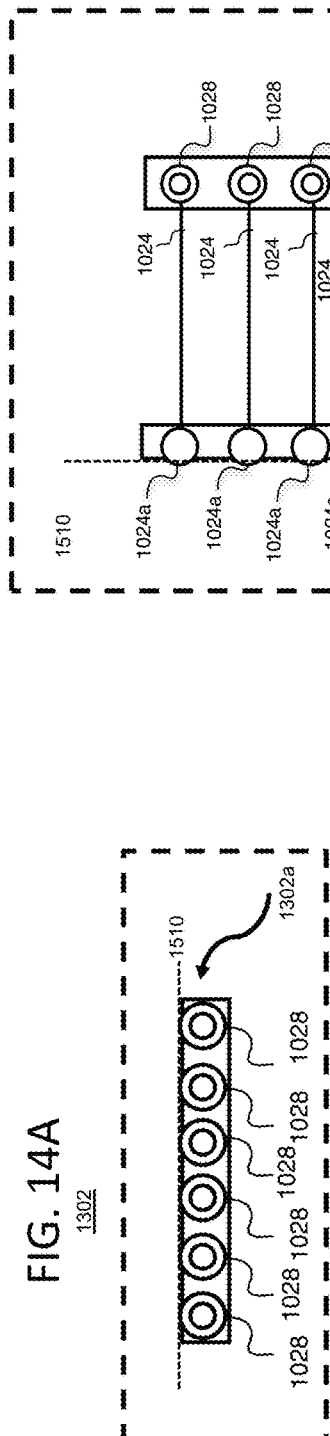
FIG. 14A
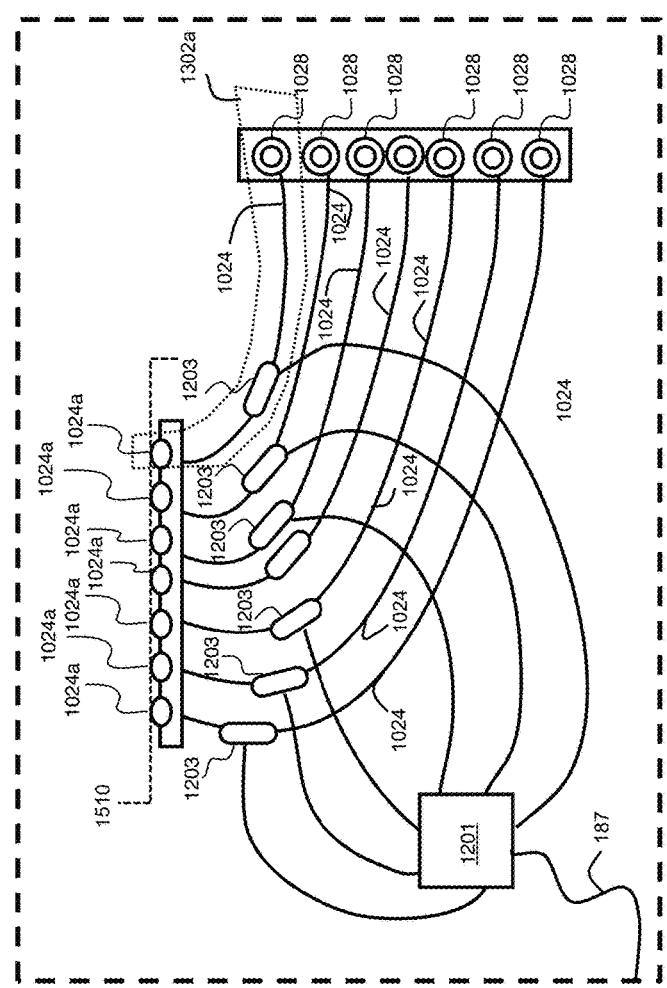
FIG. 14B
FIG. 14C

ARRAYS OF LENS-COUPLED SINGLE-MODE OPTICAL FIBERS FOR CAPTURING RADIO-FREQUENCY SIGNALS IN AN IMAGING PHASED-ARRAY RECEIVER

CROSS-REFERENCE TO RELATED APPLICATION

This application is a continuation of U.S. application Ser. No. 16/401,072 filed May 1, 2019, which claims priority to U.S. Provisional Patent Application No. 62/665,464 filed May 1, 2018, the contents of each of which is hereby incorporated by reference in its entirety

BACKGROUND

The disclosure relates generally to radio frequency (RF) receivers used to receive and demodulate radio signals, and more specifically to RF receivers that upconvert signals from RF to optical for signal processing.

Conventional RF receivers are limited in dynamic range by spurious intermixing of signals and/or jamming, either intentional or unintentional.

SUMMARY

Exemplary embodiments disclose an RF receiver including a plurality of antenna elements configured to receive RF signals, and a plurality of electro-optic modulators, each electro-optic modulator may be in communication with a corresponding one of the plurality of antenna elements to receive a corresponding one of the RF signals. The plurality of electro-optic modulators may also be configured to generate a corresponding upconverted optical signal by mixing the corresponding RF signal with an optical carrier beam. Exemplary embodiments disclose a transmission array including a first bundle of optical waveguides, each optical waveguide may have an end and be in communication with a corresponding one of the plurality of electro-optic modulators to receive and transmit a respective upconverted optical signal. Additionally, the ends of the optical waveguides of the first bundle may be arranged in a first pattern. Exemplary embodiments disclose an interference space to receive the plurality of upconverted optical signals transmitted by the first bundle of optical fibers to form a composite beam. Exemplary embodiments disclose a sensor array including a plurality of sensors that are arranged in a detection plane. The detection plane may be in optical communication with the interference space to receive the composite beam, and each of the sensors of the sensor array may be positioned to receive a respective portion of the composite beam impinged thereon. Exemplary embodiments disclose that the first pattern of the ends of the optical waveguides of the first bundle is configured to generate a first RF emitter interference pattern at the detection plane that corresponds to a first RF signal received by the plurality of antenna elements from a first RF emitter, and that the sensors of the sensor array may be positioned along the detection plane and have a geometric arrangement that corresponds to the first RF emitter interference pattern.

Exemplary embodiments disclose an RF receiver including a plurality of RF signal lines configured to transmit/receive RF signals. Each RF signal line may have a corresponding RF connector. Exemplary embodiments disclose an RF processor that is configured to simultaneously process a plurality of RF signals within a frequency range of about 3 kHz-300 GHz. Exemplary embodiments disclose a plurality of electro-optic modulators with each electro-optic modulator being in communication with a corresponding one of the plurality of RF signal lines to receive a corresponding one of the RF signals. The plurality of electro-optic modulators may additionally be configured to generate a corresponding upconverted optical signal by mixing the corresponding RF signal with an optical carrier beam. Exemplary embodiments may include a transmission array including a first bundle of optical waveguides, each optical waveguide may have an end and be in communication with a corresponding one of the plurality of electro-optic modulators to receive and transmit a respective upconverted optical signal. Additionally, the ends of the optical waveguides of the first bundle may be arranged in a first pattern. Exemplary embodiments disclose an interference space to receive the plurality of upconverted optical signals transmitted by the first bundle of optical fibers to form a composite beam. Exemplary embodiments disclose a sensor array comprising a plurality of sensors arranged in a detection plane that is in optical communication with the interference space to receive the composite beam. Additionally, each of the sensors of the sensor array may be positioned to receive a respective portion of the composite beam impinged thereon. Exemplary embodiments disclose that the first pattern of the ends of the optical waveguides of the first bundle are configured to generate a first RF emitter interference pattern at the detection plane that corresponds to a first RF signal received by the RF signal lines from a first RF emitter. Exemplary embodiments disclose that the sensors of the sensor array may be positioned along the detection plane and have a geometric arrangement that corresponds to the first RF emitter interference pattern, and that each RF connector is configured to introduce modularity and RF independence in coordination with the optical processor.

Exemplary methods of RF signal processing are also disclosed. Exemplary methods disclose providing an optical carrier beam of a first frequency and a reference optical beam of a second frequency, the first frequency and the second frequency differing by a set amount. Exemplary methods disclose receiving a first RF signal, modulating the first RF signal, and generating a plurality of upconverted optical signals by mixing the corresponding modulated RF signal with the optical carrier beam. Exemplary methods disclose projecting, simultaneously, each upconverted optical signal out of a transmission array comprising a plurality of optical waveguides, each optical waveguide may have a corresponding end, and the ends of the optical waveguides may be arranged in a first pattern. Exemplary methods disclose forming a first RF emitter interference pattern by mixing each projected upconverted optical signal in an interference space, and that the first RF emitter interference pattern may correspond to the first RF signal. Exemplary methods disclose receiving, at least partially, the first RF emitter interference pattern at an optical sensor positioned within a detection plane of the first RF emitter interference pattern, and that the optical sensor includes a plurality of sensors that have a geometric arrangement that corresponds to the first RF emitter interference pattern.

BRIEF DESCRIPTION OF THE DRAWINGS

The present disclosure now will be described more fully with reference to the accompanying drawings, in which various embodiments are shown. The invention may, however, be embodied in many different forms and should not be construed as limited to the exemplary embodiments. In the drawings, features may be exaggerated for clarity, and lines without arrows may represent bidirectional exchange between components. Like numbers refer to like elements throughout the drawings, which include the following:

FIGS. 9A and 9B show flow charts of a method for recovering an RF signal in a radio-frequency phased-array receiver in accordance with aspects of the invention.

FIG. 14A is an illustration of an exemplary embodiment of a sensor array;

FIG. 14B is an illustration of an exemplary embodiment of a sensor array;

FIG. 14C is an illustration of an exemplary embodiment of a sensor array;

DETAILED DESCRIPTION OF THE EMBODIMENTS

Figure 1:
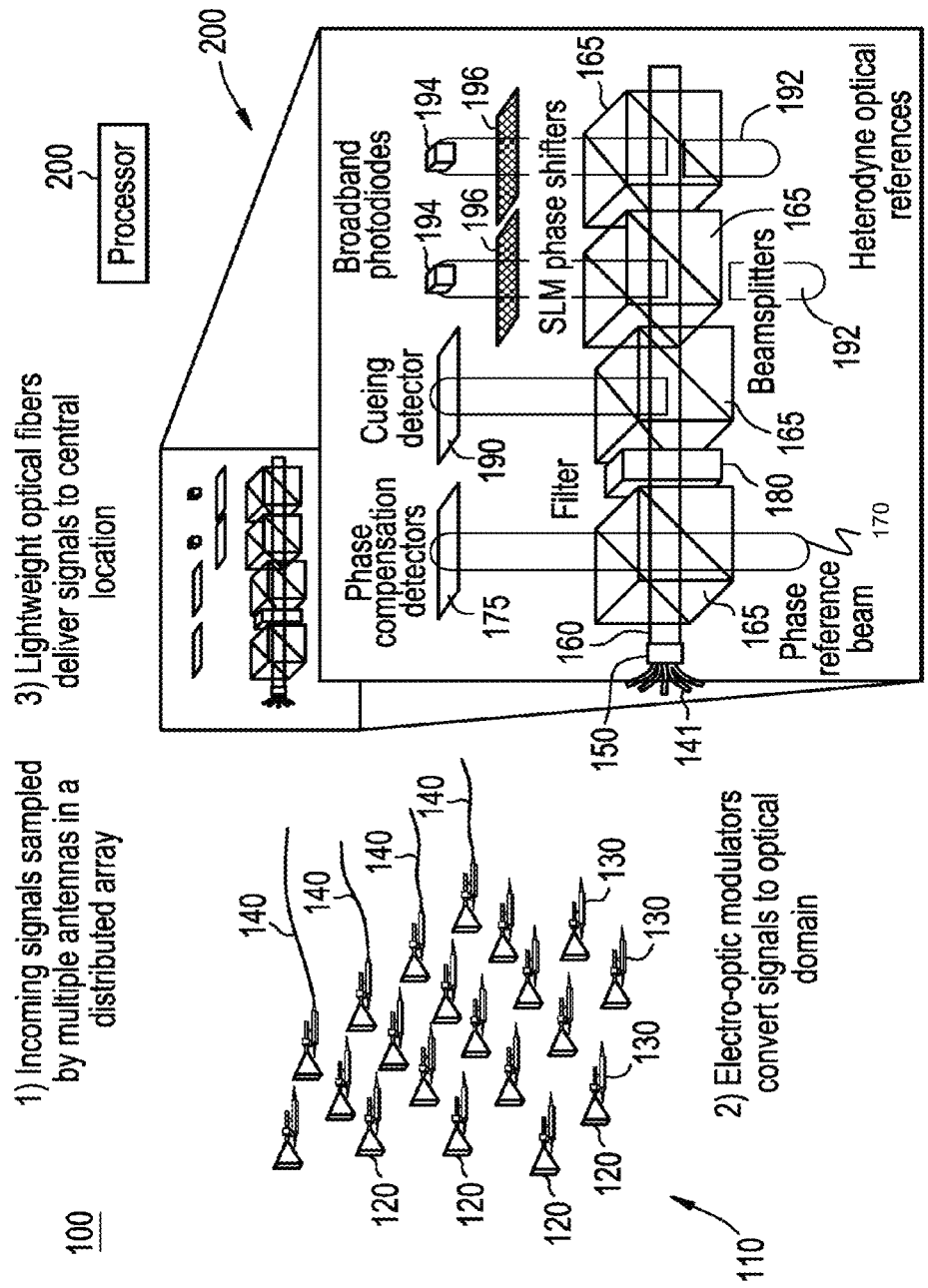
FIG. 1 is an illustration of an RF receiver in accordance with aspects of the invention.

Various exemplary embodiments will be described more fully with reference to the accompanying drawings. The inventions as described and claimed herein may, however, be embodied in many different forms and should not be construed as limited to the embodiments set forth herein.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept disclosure and claims. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings. The same reference numerals will be used to refer to the same elements throughout the drawings and detailed description about the same elements will be omitted in order to avoid redundancy.

Aspects of the disclosure are related to devices and associated methods for improving the linear dynamic range and tolerance for jamming in a wideband radio-frequency (RF) phased-array receiver. By separating signal sources spatially prior to detection/digitization, undesirable nonlinear signal mixing can be reduced or eliminated. Such mixing in conventional receivers can produce spurious intermixing products that limit the receiver's dynamic range, because they cannot be distinguished from genuine signals.

An additional advantage of the embodiments is the ability to determine a signal's angle of arrival (AoA) in real time.

This is unlike conventional receivers where AoA is determined by a cumbersome computation of the cross-correlations between signals from multiple antenna elements after detection and digitization, which result in nonlinearities and latency that are detrimental to receiver performance.

Aspects of the embodiments provide a signal detection mechanism wherein RF signals are upconverted by fiber-coupled optical phase modulators driven by the antenna elements of a phased array. The conversion results in sidebands on an optical carrier wave supplied by a laser. These optical sidebands are substantially proportional in power to the RF power incident into each antenna element, and also preserve the phase carried by the incident RF signal. This essential property of RF upconversion allows the optical sidebands to be used to reconstruct an image of the RF energy in the scene. Dynamic range is improved and resistance to jamming is increased by processing in the optical domain, because energy from separate sources is separated spatially before being detected electrically, e.g., by a photodiode or a pixel in an optical camera.

A receiver 100 in accordance with aspects of the invention is depicted in FIG. 1. The illustrated receiver 100 is a sparse-array receiver. The receiver 100 includes a processor 200 coupled to the various components within the receiver to implement the functionality described herein. Variations of suitable processors for use in the receiver 100 will be understood by one of skill in the art from the description herein.

Figure 2:
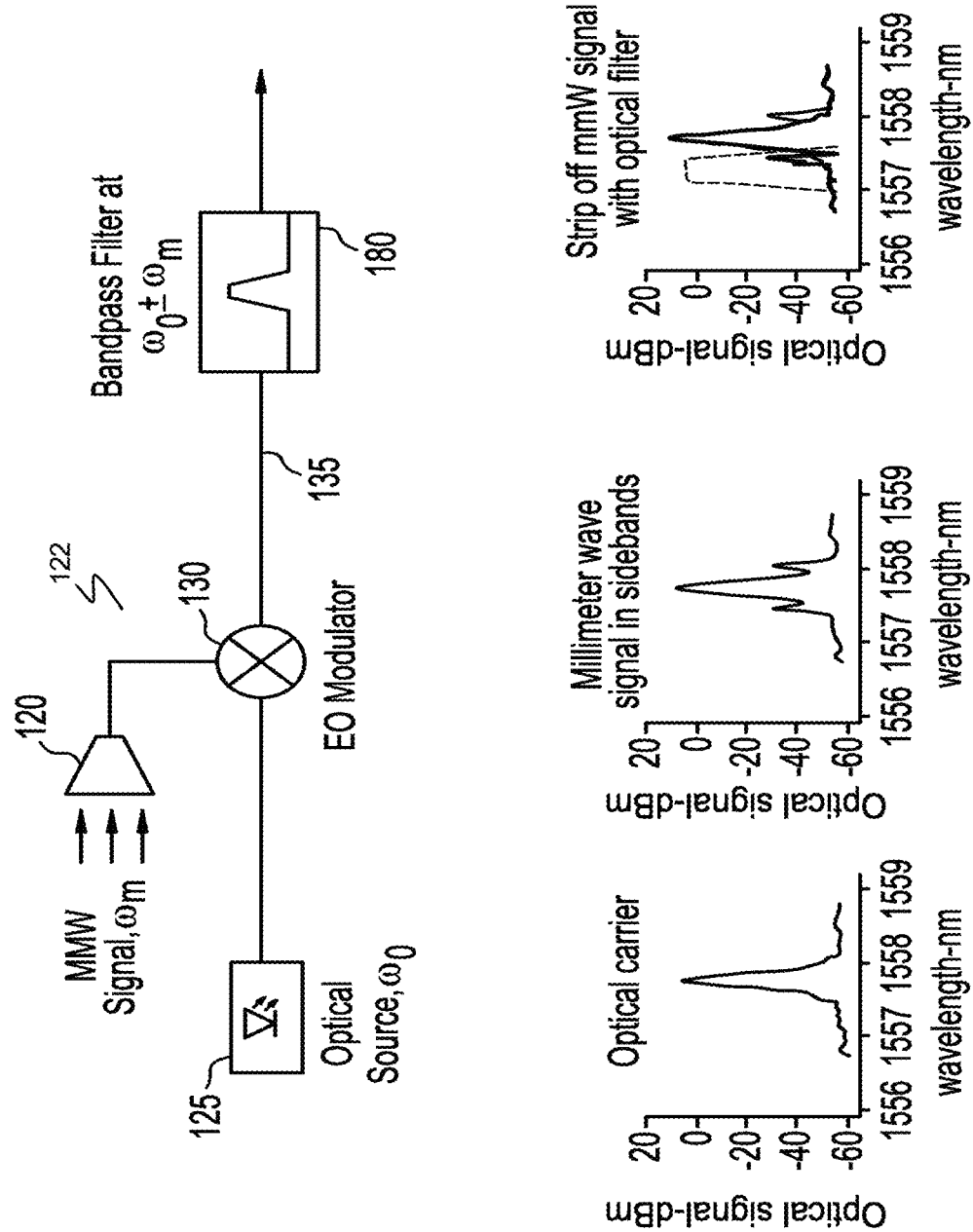
FIG. 2 is a block diagram of components for use within the RF receiver of FIG. 1 (and corresponding graphs of signals output by the optical source, electro-optic modulator and band-pass filter components) in accordance with aspects of the invention.

A phased-array antenna 110, e.g., a sparse array of M antenna elements 120 arranged in a predetermined pattern as shown in the example of FIG. 1, receives RF signals from an external source. While the antenna elements 120 shown in FIG. 1 are horn antennae, those of skill in the art understand that a variety of antenna means may be used. RF signals sampled at the antenna elements 120 are used to modulate a laser beam split M ways. An electro-optic (EO) modulator 130 is coupled to each of the antenna elements 120 and receives a branch of the split laser beam that it uses to convert the RF energy received at each antenna element 120 to the optical domain. It does so by modulating the optical (carrier) beam produced by the laser. The time-variant modulation manifests itself in the frequency domain as a set of sidebands flanking the original carrier frequency (or wavelength), at which the source laser operates, as illustrated in FIG. 2, which is discussed in more detail below. As a result, the energy radiated in the RF domain appears in the optical domain as sidebands of the carrier frequency. This up-conversion of the RF signal into optical domain is coherent in the sense that all the phase and amplitude information present in RF is preserved in the optical sidebands. This property of coherence preservation in optical up-conversion allows the recovery of the RF-signal angle of arrival using optical means.

Figure 3:
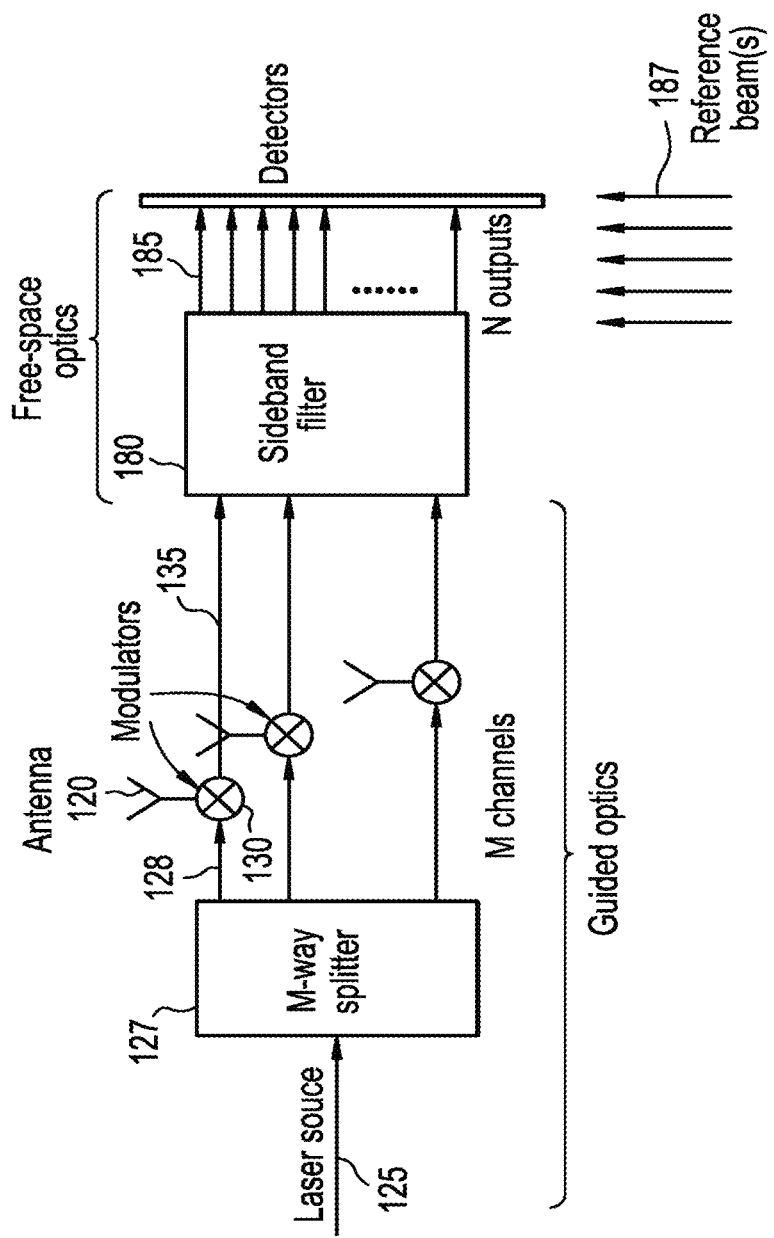
FIG. 3 is a block diagram of additional components for use within the RF receiver of FIG. 1 in accordance with aspects of the invention.
Figure 4:
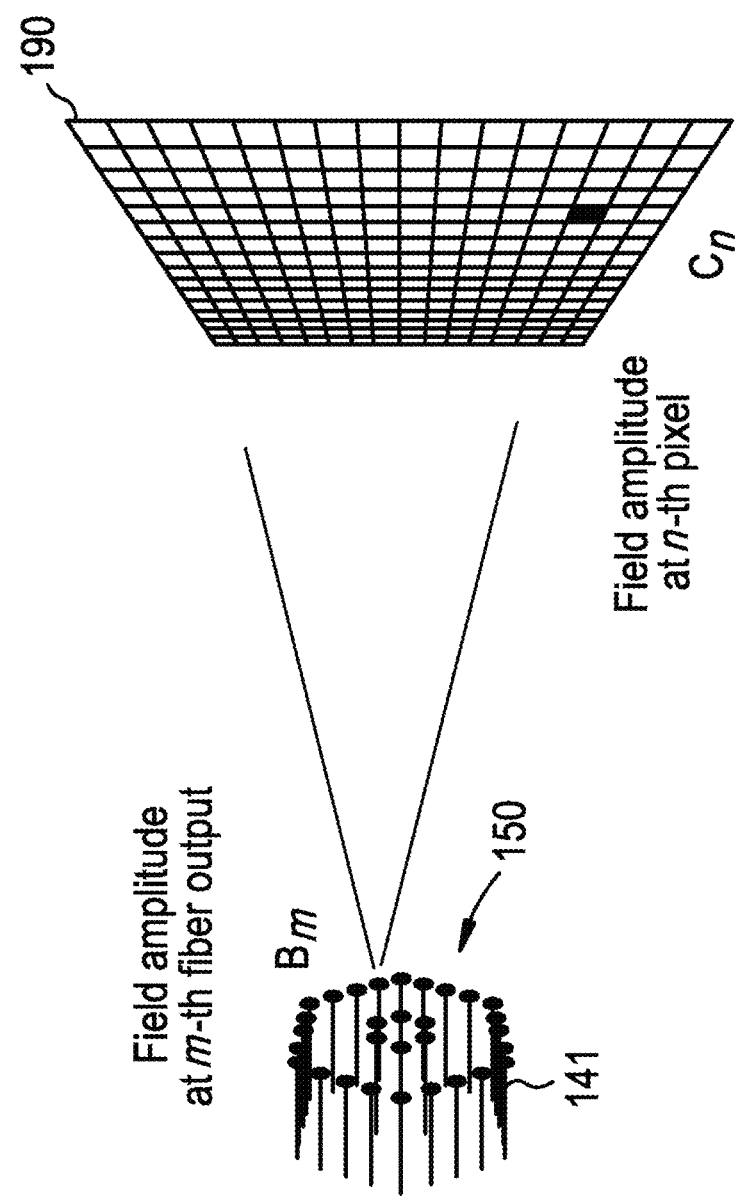
FIG. 4 is an illustration to aid in defining various quantities appearing in the explanation of the operation of the invention.

Returning to FIG. 1, the modulated optical beams containing the laser carrier wavelength and the sidebands with imprinted RF signal are conveyed by optical fibers 140 to a lenslet array 150 coupled to the outputs 141 of the fibers 140 that are arranged in a second pattern that mimics or corresponds to the first pattern of the array of the RF antennas, at a reduced scale, e.g. FIG. 4 illustrates the output ends of the optical fibers 140 arranged in a pattern that corresponds to the pattern of the antenna elements 120 of FIG. 1. As illustrated in FIG. 4, from the outputs 141 of the optical fibers 140 at the lenslet array 150 on, the beams propagate in free space, no longer guided by the optical fibers. While the embodiment of FIG. 1 shows conventional optical fibers 140 between the electro-optic modulators 130 and the processor 200, those of skill in the art will appreciate that other optical waveguides or channels may also or instead be used (as illustrated in FIG. 3). Similarly, while FIGS. 3 and 4 illustrate the use of a free space in the processor 200 as a channel for forming a composite optical signal from light emanating from the outputs of the optical fibers 140, those skilled in the art will appreciate that other optical channels can be used for forming a composite optical signal.

Again referring back to FIG. 1, the individual beams propagate in free space from the outputs 141 of fibers 140 at the lenslet array 150, which allows the individual beams to interfere with one-another where they overlap to form a combined or composite beam 160. Part of the combined beam 160 is split off with a beam-splitter 165, mixed with a reference beam 170, and sent to an array of detectors 175 (phase-compensation detectors in FIG. 1) in order to detect, and allow for the compensation of, optical phase variation originating in the individual fibers 140 due to environmental conditions such as vibrations and acoustics. This ensures that the resulting image corresponds to spatial distribution of RF sources in the scene as opposed to vibrating fibers. A band-pass optical filter 180, see FIG. 1, strips off the carrier wavelength and allows only one of the sidebands through (as discussed below with respect to FIG. 2). The overlapping beams that now carry only a single sideband are projected onto a cueing detector 190, e.g., a charge coupled device (CCD) array, where they interfere to form a representation of the RF angle of arrival in the optical domain. An optical image may be formed by the overlapping beams on the cueing detector 190 may substantially be a replica of the RF scene as seen by the sparse antenna array 110.

FIG. 2 illustrates the use of an optical filter 180 to recover or isolate an optical sideband that corresponds to a received RF signal, which may for example be a millimeter wave (MMW) signal having a frequency Wm. As shown in the graphs of FIG. 2, the received RF signal(s) from antenna element(s) 120 modulate with an optical carrier signal (source) 125 operating at a frequency $\omega_0$ (illustratively at a wavelength between 1557 and 1558 nm). The output 135 of modulator 130 includes an optical analog of the MMW signal in sidebands of the optical carrier as shown in the middle graph. An optical band-pass filter 180 tuned to $\omega_0+\omega_m$ or $\omega_0-\omega_m$ strips off (isolates) the optical representation of the received MMW signal(s) from the carrier.

FIG. 3 depicts the configuration of a receiver 100 with an emphasis on the optical layer. The single laser source 125 is split M ways by a splitter 127 and the beams 128 are routed through modulators 130 coupled to antennas 120 capturing the RF radiation. The (optical) outputs 135 of the modulators 130 are filtered to allow only a single sideband corresponding to the captured RF radiation to pass, for example using a filter 180 as described with FIG. 2. The free-space interference of the optical beams 185 output from filter 180 among the M different channels yields a pattern measured with detectors, as discussed in more detail below. Mixing the interference pattern produced by the outputs 185 with reference beam(s) 187 allows for the extraction of information carried in the optical beam(s) modulated with incoming RF signal(s).

Note that FIGS. 1 and 3 depicts the filter 180 positioned in the free-space portion of the receiver 100 downstream of the lenslet array 150. In alternative embodiments, the filter can be placed anywhere between the modulators 130 and the cueing detector 190 to enable reconstruction of the RF-source position in the optical domain. Furthermore, in some embodiments, especially for frequencies lower than ~5 GHz, a Mach-Zehnder modulator (MZM) may be used for filter 180 to filter out the sideband energy from the optical carrier energy. Such modulators can, under appropriate bias conditions, interferometrically suppress the carrier while passing the (odd-ordered) sidebands, thereby suppressing the carrier in a frequency-independent manner.

The cueing detector 190 of FIG. 1 may be an array of photo-detectors such as those of a charged coupled device (CCD) or contact image sensor or CMOS image sensor, which in some embodiments may not be able to decode information present in the RF signals received by the antenna array 110 with the same performance as high-speed photodiodes. In some embodiments, to extract or recover information encoded in the RF signals input by the antenna elements 120, the composite optical beam output from filter 180 is further split with additional beam-splitters 165, and combined with reference laser beams 192 for heterodyne detection at fast photodiodes 194 as illustrated in FIG. 1. A few examples of non-spatial information encoded into an RF signal that may be detected by photodiodes 194 include amplitude, phase, and/or frequency modulation of an RF carrier with information-bearing signal. The information-bearing modulating signal may be analog or digital in nature. In the latter case, the information may be contained in frequency-division multiplexed, time-division multiplexed, or code division multiple access signals (FDM, TDM or CDMA respectively; using telecommunication examples for more specificity for each, e.g., OFDM, GSM, or WCDMA signals). For example, each photodiode 194 may receive an OFDM signal comprising multiple carrier signals that are orthogonal to each other. Each of the multiple carrier signals may be appropriately demodulated (e.g., to baseband) to extract data (e.g., a digital data comprising binary bits of 0's and 1's). Each OFDM signal received by each photodiode 194 may comprise multiple channels of data, each associated with a different transmission (e.g., each associated with a different audio signal or different video signal). As is known, a channel of digital data need not be carried by a single carrier but may be spread across multiple ones of these carriers (e.g., via frequency hopping or interleaving). The RF carriers of the OFDM signals simultaneously transmitted by the RF sources and received by each photodiode 194 may have same frequencies; interference amongst the simultaneously received OFDM signals may be avoided due to the spatial separation of the RF sources. Each OFDM signal received and demodulated by each photodiode 194 may correspond to an OFDM RF signal transmitted by one or more of the RF sources and received by antennas 120 (e.g., in the millimeter wavelength RF range, or in a range of 3 to 300 GHz, or between 0.5 to 300 GHz, such as 0.5-110 GHz, or in the HF band of 3 to 30 MHz, or in VHF band of 30 to 300 MHz, or in UHF band of 300 MHz to 1 GHz). Thus, for example, antennas 120 may receive multiple OFDM signals each having multiple channels to carry multiple transmissions of digital data on multiple signal carriers, such as digital audio (e.g., MP3, MPEG), digital images digital video (e.g., MP4), data in TCP/IP format, etc. Optical conversion and processing (as described herein) may provide each of these OFDM signals emanating from different RF transmitters to a different corresponding photodiode as a converted optical signal. Although the above example describes transmission and receiving of one or more OFDM signals, other RF encoding/decoding schemes (as noted herein) may be utilized and processed in the optical domain in a similar manner. Spatial light modulator (SLM) phase shifters 196 ensure that the sources of RF radiation, detected as bright spots in the cueing detector 190, are imaged on the fast photodiodes 194 individually. In FIG. 1 two such fast photo-diodes 194 with the corresponding SLMs 196 are shown for illustration; they allow receiving signals from two distinct RF sources simultaneously. Increasing the number of photo-diodes 194 with the corresponding SLMs 196 and beam splitters 165 increases the number of received RF signals that can be processed simultaneously to extract or recover information.

In alternative embodiments, an array of suitably fast photo-detectors can be used in place of the relatively slow CCD in the cueing detector illustrated in FIG. 1. Upon mixing with optical references, such alternative detector array embodiments provide means for both spatial discrimination of the RF sources, and extracting information carried by the corresponding RF signals. In these alternative embodiments, the additional beam splitters 165, SLMs 196 and photodiodes 194 shown in FIG. 1 are unnecessary.

Below, further details on the optical reconstruction of the RF scene are presented. To reconstruct the image of the RF scene in the optical domain, the (optical) outputs of the modulators 130 are carried in optical fibers 140 to a lenslet array 150 that mimics the spatial distribution of the antennas 120. The output beams are then allowed to interfere in free space (or other suitable channel for forming a composite optical signal), and the interference pattern corresponding to the original RF scene is captured by an array of optical sensors, such as a CCD chip embodiment of cueing detector 190. In the absence of spectral filtering, the image reconstruction process can be expressed as follows:

$$C_n = \frac{1}{\sqrt{N}} \sum_{m=0}^{M-1} B_m e^{i(\omega t + \theta_{nm} + \varphi_m)} + c.c. \qquad (1)$$

where, with reference to FIG. 4, $B_m$ is the amplitude of the field at the output of the m-th fiber, $C_n$ is the electric field (of light) at the n-th pixel of the CCD (in the absence of spectral filtering), $\omega$ is the optical frequency, $\varphi_m$ is the (RF-modulated) phase of the optical beam in the m-th fiber, and $\theta_{nm}$ is the phase the optical beam picks up as it propagates in free space from m-th fiber to n-th pixel; it is assumed that there are M optical fibers, N sensing elements in the CCD array, and that the intensity of light coming out of each fiber is evenly distributed among the N sensors of the CCD; c.c. signifies the presence of complex conjugate of the first term that makes the electric field a real number. As noted, the beams output by the optical fibers 140 are allowed to interfere in an interference providing space (a fiberless space). Such an interference space may be transparent and may comprise a vacuum, air, a gas other than air, a liquid or a solid (e.g., a lens or a slab waveguide).

For the purpose of the following analysis, the RF (e.g., mmW) scene is divided into discrete RF emitters enumerated with index k. The phase imposed on the optical carrier in the m-th channel by k-th RF emitter is $$S_k \cos(\Omega t + \phi_{km}) \qquad (2)$$

where $\Omega$ is the frequency of the RF signal, $S_k$ is the amplitude of the wave emitted by the k-th emitter, scaled by modulation efficiency and the distance from the aperture, and $\phi_{km}$ is the phase picked up by the wave between the k-th emitter and the m-th antenna element of the array. The total phase in the m-th channel is obtained by adding contributions from all RF sources in the scene, i.e.

$$\varphi_m = \sum_k S_k \cos(\Omega t + \phi_{km}). \qquad (3)$$

If the RF waves originating at different positions are uncorrelated, it can be shown that Eqs. (1), (2) and (3), in combination with spectral filtering that allows only one sideband through, yield the following average power detected at the n-th pixel of the CCD array $$P_n = \sum_{m,m'} e^{-ik_n \cdot (x_m - x_{m'})} \sum_k S_k^2 e^{iK_k \cdot (X_m - X_{m'})}. \qquad (4)$$

Equation (4) has a form of a composition of Fourier and inverse-Fourier transformations, and therefore, it spatially reconstructs the positions of the RF sources present in the scene as bright spots on the CCD array. In Eq. (4), $K_k$ is the wave-vector of the RF wave associated with k-th source, $X_m$ is the position of the m-th antenna in the array, $x_m$ is the position of the m-th fiber in the array, and $k_n$ is the wave-vector of the optical wave-form produced by the fiber array that is collected by the n-th pixel in the CCD array.

The information of the positions of the sources of RF radiation obtained this way from the cueing detector 190 is then used in the SLM phase shifters 196 to project the regions of interest onto fast photo-detectors 194, which, with the help of a heterodyne optical reference 192, convert the modulated light back into RF for further processing.

FIG. 9A depicts a flow chart 10 of steps for spatial discrimination of RF sources and the corresponding signal detection in a radio-frequency phased-array receiver according to aspects of the inventions. The steps of flow chart 10 may be performed using the receiver depicted in FIG. 11 as well as a wide variety of other embodiments that would be apparent to those of skill in the art.

At step 12, the incoming RF signal is received (or sampled, etc.), e.g., by a phased-array antenna. The incoming RF signal from each of at least one source may be sampled with a plurality of antenna elements in a phased-array antenna. The phased-array antenna may be arranged in a first pattern.

At step 14, an optical carrier is modulated with the received RF signal. An optical carrier may be modulated by each of the at least one RF signal received by each of the plurality of antenna elements with a corresponding electro-optic modulator. The optical modulation of the optical carrier with the RF signals results in a modulated optical beam comprising at least one sideband flanking the optical carrier.

At step 16, each of the modulated beams may be directed along an optical channel, e.g., an optical fiber. Each optical fiber has an output for passing its corresponding modulated signal to a composite signal channel, such as a free space, in which a composite optical signal will form from combined outputs. The outputs of the plurality of optical fibers may be arranged in a second pattern corresponding to the first pattern, wherein propagation of the optical beams from the outputs into free space forms an interference pattern.

At step 18, each of the RF-modulated optical signals is filtered to isolate one of the sidebands.

At step 20, information contained in at least one RF signal is recovered or extracted. The RF signal information may be recovered by identifying a signal position within the interference pattern corresponding to a spatial position of the source of the RF signal. Non-spatial information, such as information encoded onto the RF signal that corresponds to that signal position, may be detected or extracted from the corresponding modulated optical signal.

FIG. 9B depicts a flow chart 20 of steps detailing the process for the recovery or extraction of information of the RF signal(s). The steps of flow chart 20 may be performed using the receiver depicted in FIG. 1, although those of skill in the art will understand a variety of other embodiments are suitable for performing the steps.

At step 22, the signal positions are detected by a first detector. For example, the interference pattern may be directed onto a cueing detector to identify the signal positions where each identified signal position corresponds to the spatial position of an RF source.

At step 24, the non-spatial information of the RF signals is extracted or recovered from the corresponding modulated optical signals. The interference pattern may be directed onto a signal detector with a spatial-light-modulator, using the signal positions identified in step 22, to extract or recover the information from the RF signals from at least one source.

In another embodiment, the RF signal may be recovered by directing the interference pattern onto a signal detector that identifies the signal positions, where each identified signal position corresponds to the spatial position a source. The same signal detector additionally detects the RF signals from each of the at least one source at the identified signal positions within the interference pattern.

In preferred embodiments incorporating multiple high-speed photodetectors, each of the fast photodetectors receives power from only one element of the scene—from one RF source—while effectively suppressing all other sources that may be present. Below, issues related to such mapping are quantified, and expressed in terms of the enhancement of effective dynamic range.

Spatial filtering may be employed to improve effective dynamic range. The spatial separation of the RF radiation arriving from different directions prior to electronic processing provides means for suppressing unwanted (jamming) sources as long as they are not collocated with the region of interest. Such suppression is equivalent to effective enhancement of the dynamic range: the receiver is capable of detecting a weaker signal in the presence of a stronger source than would otherwise be possible in a conventional configuration.

Specifying certain functional characteristics of the receiver can quantify this enhancement. First is the number of independent elements, N, of the reproduced image of the RF scene. Essentially, N is equal to the field of view of the antenna array divided by the resolution. Another way to look at the number of independent elements is by using concepts developed by Claude Shannon in the context of telecommunications. The time-bandwidth product, which is equal to the dimension of the space of all possible messages that can be transmitted in a given channel over a certain bandwidth in a given time, plays a central role. The analogue of the time-bandwidth product in the case of imaging with a 2D aperture is the area-spatial-frequency-bandwidth product. To calculate spatial-frequency-bandwidth, the frequency (or wavelength) and the field of view are needed. The spatial frequency captured by the aperture is obtained by projecting the incident k-vector on the aperture plane. The higher the incidence angle at a given frequency, the higher the spatial frequency. Thus, for a square aperture and square field of view, ±θ in each direction, the spatial-frequency-bandwidth is $$\left[2\frac{v\sin(\theta)}{c}\right]^2, \tag{5}$$

where v is the frequency of the received RF signal, and c is the speed of light. Assuming a square aperture with side L, and the respective area $L^2$, the number of independent image elements is $$N = \left[2\frac{vL\sin(\theta)}{c}\right]^2. \tag{6}$$

Another concept required for the evaluation of the equivalent dynamic range enhancement is the diffraction efficiency η of the antenna array. In the language of diffractive optics, the diffraction efficiency measures the fraction of the overall received power that ends up in the desired location or direction. In the context of the embodiments disclosed herein, it is useful to consider a distant point source illuminating the antenna array. On the imaging side, in the cueing detector, the point source becomes an image consisting of a spike at one location, and some increased background level elsewhere. In other words, in addition to the one desired image element, the point source also illuminates all other N−1 image elements to some extent. The ratio of the power received in the desired element to the total power received is the diffraction efficiency η.

The number of elements that can be realized on a given platform is limited to its maximum physical extent. As an example, for a source at 3 GHz the number of resolvable elements would be limited to approximately N=400 for a 1-meter aperture into a 2π steradian solid angle field of view. At 106 GHz, the same aperture affords N=500,000.

Figure 5:
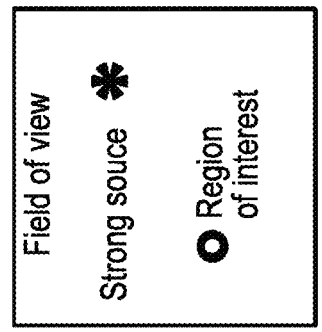
FIG. 5 is an illustration of an RF scene setup to illustrate calculating dynamic range enhancement in accordance with aspects of the invention.

To calculate the enhancement of the effective dynamic range, consider a case depicted in FIG. 5 where the signal of interest comes from the region of interest denoted as o in the presence of a strong source marked as *. As indicated above, the strong source, in addition to producing a bright spot in the respective image location, will deposit energy in all other locations including the region of interest. Assuming that the total power coming from the strong source is P*, the power delivered to point * is ηP*. Therefore, the total power delivered to all image elements excluding * is (1−η)P*. Assuming that the power from the strong source that misses the mark is evenly distributed among the remaining N−1 elements, the region of interest o receives $$\frac{1-\eta}{N-1}P^* \tag{7}$$

as its share. At the same time, fraction η of power P° originating at the region of interest is deposited at the point corresponding too. Therefore, the ratio of the desired power to the undesired power at the observed region of interest is $$\frac{\eta}{1-\eta}(N-1)\frac{P^\circ}{P^*}. \tag{8}$$

In the absence of spatial filtering, each antenna element of the array receives the total power originating at the entire field of view and passes all of it for electronic processing. Therefore, the ratio of the desired power to the undesired power that need to be discriminated is $$\frac{P^\circ}{P^*}. \tag{9}$$

By comparing expressions (8) and (9), the enhancement of the desired to the undesired power ratio that needs to be processed electronically is obtained as $$\frac{\eta}{1-\eta}(N-1). \tag{10}$$

Formula (10) may be interpreted as the effective enhancement of the dynamic range of the receiver. Such interpretation is justified by the way it was derived as the ratio of ratios of desired to undesired powers that need to be processed electronically. In other words, all else being equal, the receiver can tolerate the level of 'jamming' power increased by a factor η(N−1)/(1−η) and deliver the same performance in terms of detecting the desired signal as a conventional receiver configuration.

Figure 6:
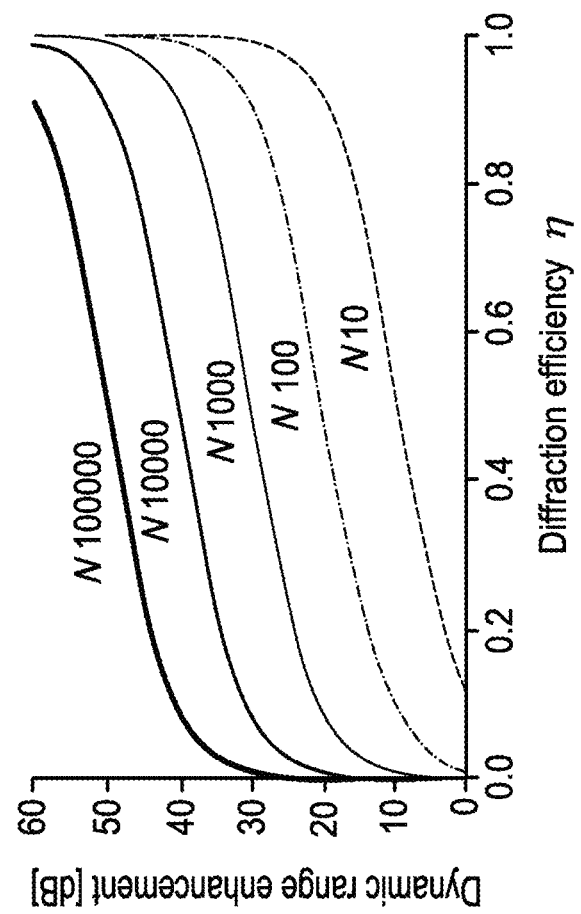
FIG. 6 is a graph illustrating dynamic range enhancement as a function of diffraction efficiency in a spatially-discriminating sparse-array receiver for different numbers of independent image elements in accordance with aspects of the invention.

The dependence of the dynamic range enhancement as a function of diffraction efficiency for several different values of N is shown in FIG. 6. Note that the minimum enhancement is always 0 dB. This can be ascertained by noting that the minimum diffraction efficiency occurs when the incoming power is evenly spread among all N elements of the RF signals captured by the antenna array, i.e. η=1/N. Substituting this value to expression (10) yields 1, or, equivalently 0 dB. On the other hand, at high diffraction efficiency approaching 1, which corresponds to fully populated antenna arrays, the dynamic-range enhancement is divergent—it tends to infinity. Such behavior may intuitively be understood by noting that at high diffraction efficiency, negligible amounts of power leak to image elements that do not correspond to the position of the source, i.e., the region of interest o receives negligible power from source *. As a result of this almost ideal spatial filtering, the ability to jam the receiver by using a spatially separated strong source may be effectively eliminated.

An assumption of this analysis is that the power from the unwanted source is evenly distributed across the other elements of the array. In actuality, this distribution will be non-uniform, with nulls that can be adjusted to further reduce contributions from unwanted sources. Thus, using smart nulling techniques that are known to those of skill in the art, embodiments can provide significant improvement in dynamic range beyond the nominal the results described above.

Tests to demonstrate aspects of embodiments of the inventions have been performed, as discussed below.

Figure 7:
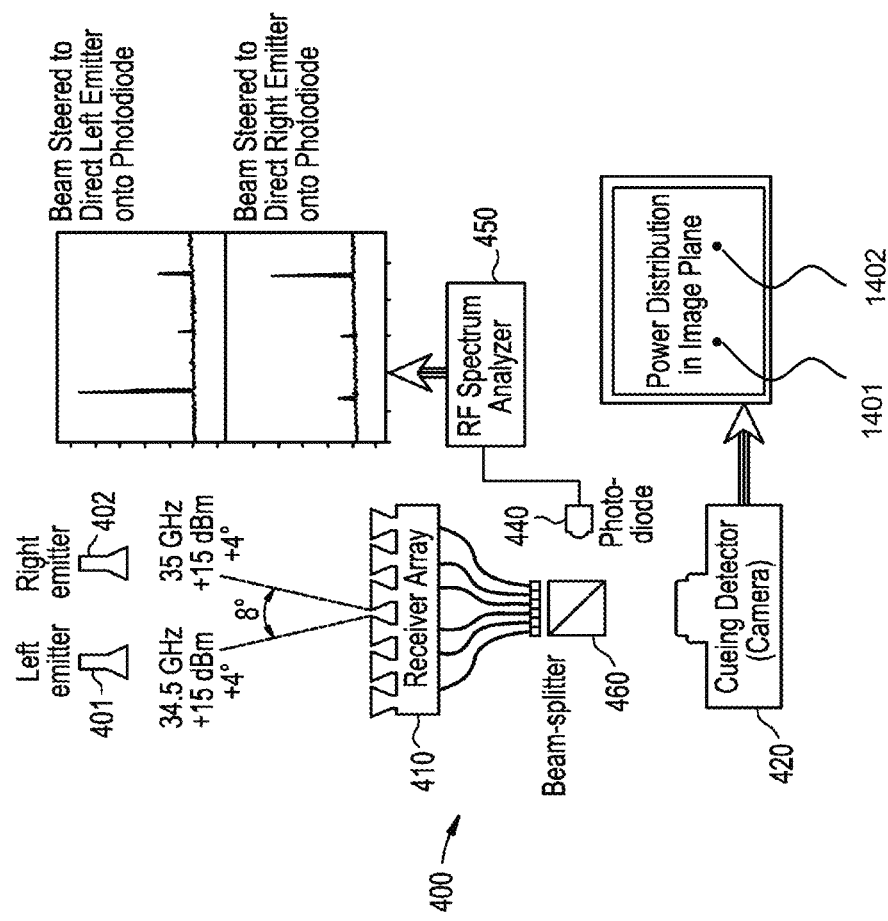
FIG. 7 is a block diagram and corresponding results of an experimental demonstration of an imaging receiver used to spatially distinguish between two active signal emitters in accordance with aspects of the invention.

FIG. 7 depicts a schematic illustration and representative preliminary data obtained from a test configuration 400 to demonstrate spatially separating signals via optical upconversion and imaging prior to electronic detection. An array of receivers 410 comprising optical modulators (130) driven by antennas (120) was used to obtain an image of two ~35-GHz emitters (34.5-GHz left emitter 401 and 35.0-GHz right emitter 402). The system used an image reconstruction in the optical domain by the camera 420, in parallel with optical phase steering by applying DC bias to optical modulators (130 in FIGS. 1 and 2) to direct energy from the emitters onto a high-speed photodetector 440. The photodetector 440's output spectra were measured by an RF spectrum analyzer 450 and are shown at the top right of FIG. 7. The image obtained by the system is shown at the lower right of FIG. 7, and consists of two bright spots 1401 and 1402, respectively corresponding to RF emitters 401 and 402. After upconversion, but before detection by the camera, a beamsplitter 460 was used to separate a portion of the optical energy and direct it to the high-speed photodetector 440. Optical phase shifting in each of the modulators 130 was used to steer the image of either emitter to the photodetector. Electrical spectrum-analyzer traces of the detector output are shown in the upper right region of FIG. 7: The top spectrum is for the case when the image was steered to direct the energy of the left emitter 401 operating at 34.5 GHz onto the photodetector 440 whereas the bottom spectrum corresponds to steering the image so as to direct the energy of the right emitter 402 operating at 35.0 GHz onto the photodetector 440. The two sources 401, 402 operated at the same power levels for the capture of the two spectra. The difference in the two spectra, in particular the difference in the detected relative intensities between the two different sources, is the result of spatial discrimination between the two sources as afforded by the test embodiment which implemented aspects of the inventions.

Figure 8:
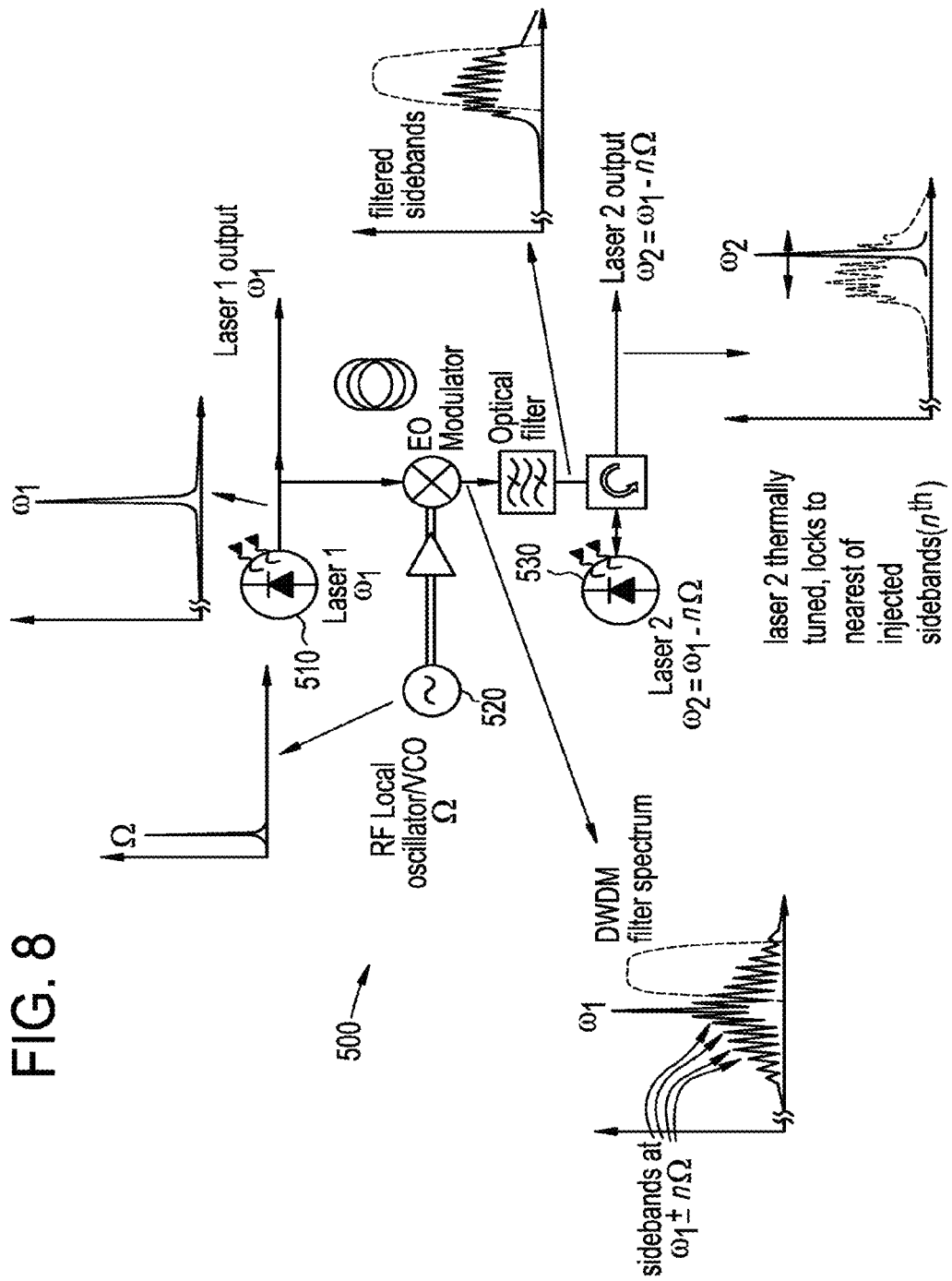
FIG. 8 is a block diagram of a single-channel optical reference source for heterodyne detection in accordance with aspects of the invention.

In the case of this test demonstration, the sidebands were detected by beating with a residual of the optical carrier frequency, hence electrical signals were obtained directly at the frequencies of the emitters. An additional aspect of some embodiments, as illustrated in FIG. 8, is the use of a coherent optical local oscillator (LO) for converting the sideband energy to a more accessible intermediate frequency (IF). This heterodyne technique allows the detection of signals over a widely tunable frequency range, and also eases the bandwidth required of detectors such as photodiode(s) (for example, photodiodes 194 of FIG. 1). FIG. 8 illustrates an optical source 500 configured to an optical carrier beam (e.g., Laser 1) and a reference beam (e.g., Laser 2). The optical carrier beam has a first frequency and the reference beam has a second frequency. The first frequency and second frequency differ by a set amount (where this difference in frequency may be set by an input to the optical source 500, such as by a user input (e.g., programmed)). In addition, the optical carrier beam and the reference beam may be phase-locked. A single (master) laser (510) may be used not only to feed all the modulators in the array, but also to generate the coherent heterodyne optical LOs according to the scheme shown in FIG. 8 and described below. As depicted in FIG. 1, beam-splitters 165 and spatial light modulators (SLMs) 196 may then be used to direct spatially filtered signals from their respective positions in the image plane onto photo-diodes 194 for heterodyne detection. The optical LO generation technology is based on modulation-sideband injection locking of semiconductor lasers, offering enormous bandwidth, superb signal purity via cancellation of optical phase noise, and a minimal size weight and power (SWaP) due to the use of optical fibers and photonic components.

Wide tunability is realized by injection locking using a broad comb of harmonics, all derived from externally modulating Laser 1 (510) with a low-frequency RF reference 520 that has been subject to nonlinear distortion as shown in FIG. 8. The output of Laser 1 is used as the optical carrier in the description above. Laser 2 (530) is tuned to match and lock to the frequency of any one of the injected harmonics and is used as a reference beam 187 (e.g., 170 or 192). Choosing higher harmonics allows very high offset frequencies to be obtained, and because the locked lasers have identical phase noise, the purity of the reference is preserved. Continuous fine-tuning is available from a tunable reference, e.g., the voltage controlled oscillator (VCO) 520. This approach has been demonstrated to provide for continuous tuning over at least 7 octaves (0.5-110 GHz), with a measured linewidth of ~1 Hz over that entire range. This approach enables continuous tuning up to and exceeding 300 GHz by use of improved modulator technology.

Notably, the photo-diode for RF signal recovery, broadband photodiodes 194 in FIG. 1, need only possess sufficient speed for the intermediate frequency plus the signal bandwidth, not the RF carrier frequency, so the tuning range of the receiver is not photo-diode limited, and can extend to the full range of the modulator's operation. This feature allows use of photodiodes with higher optical power handling and output photocurrents. Using such photodiodes in this architecture allows signals to be received with net gain, and with spur-free dynamic range (SFDR) in excess of 120 dB $HZ^{2/3}$. Note that this estimate does not include the improved dynamic range afforded by spatial filtering as described above.

Exemplary embodiments disclosed above describe various methods and imaging receiver embodiments to capture and spatially process radio-frequency (RF) signals by upconversion using an array of electro-optic (EO) modulators. The spatial processing enables the separation and isolation of signals received from multiple RF signal emitters according to the locations of the RF emitters.

As noted, the outputs 141 of the plurality of optical fibers 140 (optical waveguides) may be arranged in a pattern corresponding to the arrangement pattern of the plurality of antenna 120 of the antenna array 110. In some examples, the distribution of antenna elements 120 and thus the corresponding arrangement of the outputs 141 of optical fibers 140 may result in spatial variations in the distribution of the optical energy on the image plane of processor 200 with respect to a particular RF emitter. For example, when the distribution of antenna elements in the antenna array is uniform and regular, the positions of the outputs 141 of the plurality of optical fibers may also be uniform and regular. Thus, optical beams 185 emitted into free space/interference space may generate an interference pattern where portions of the interference pattern corresponding to one RF emitter may be spatially divided.

The optical energy (i.e., intensity) corresponding to an RF emitter at an image plane of the processor 200 may be spatially divided (e.g., with respect to a particular direction along an image plane, having a variation (e.g., periodic variation) in intensity and thus forming local maximums and local minimums of the optical energy at the image plane for that RF emitter). Local minimums may be located at discrete points of the detection plane where there is destructive interference of optical beams 185 (forming composite beam 160) and therefore little or no energy is provided to these locations at the image plane. Local maximums of energy at the image plane may be formed by constructive interference of the optical beams 185 (forming the composite beam 160) and be interspersed between the local minimums. Each RF emitter may produce a corresponding optical light pattern in the image plane of optical processor 200 of imaging receiver 100 that is similar to coherent light transmitted through a diffraction grating, e.g., patterns of light formed as concentric circles, parallel lines or dots. The optical light pattern corresponding to an RF emitter may be a light pattern having a location of maximum light intensity and neighboring locations of lesser peak intensities (corresponding to local maximums of light intensity). These neighboring locations may be adjacent to one another and may be separated by null points in intensity of the composite beam at an image plane of the optical processor 200.

In accordance with disclosed embodiments, an array of detectors are arranged in an image plane of optical processor 200 (or other detection plane) such that when an optical image (e.g., light pattern) corresponding to an RF emitter falls on one sensor of the sensor array, nulls of the light pattern are centered on the positions of all the other sensors. This may form an orthogonally sampled beam space (OSBS) at the image plane. This type of arrangement may enhance the spatial isolation achievable by the imaging receiver.

Referring to the example of FIG. 7, the exemplary image of an RF scene (lower right in FIG. 7) includes RF emitter images 1401 and 1402 (two bright spots in the image of the RF scene) respectively corresponding to left emitter 401 and right emitter 402. In some examples, the bright spots forming these RF emitter images 1401, 1402 may be in the form of an RF emitter interference pattern. Note that the RF emitter images 1401, 1402 and corresponding RF emitter interference patterns described herein may be formed at an image plane (or other focal surface whether planar or curved) of optical processor 200 with or without combining beams 185 with a reference beam 187 (such as 170 or 192 of FIG. 1). The related description herein of RF emitter interference patterns, positional relationships to sensor locations, etc., should thus be understood to apply to both instances of interference patterns produced by optical beams 185 as combined with a reference beam 187 and to interference patterns produced by optical beams 185 without combination with a reference beam 187.

Figure 10A:
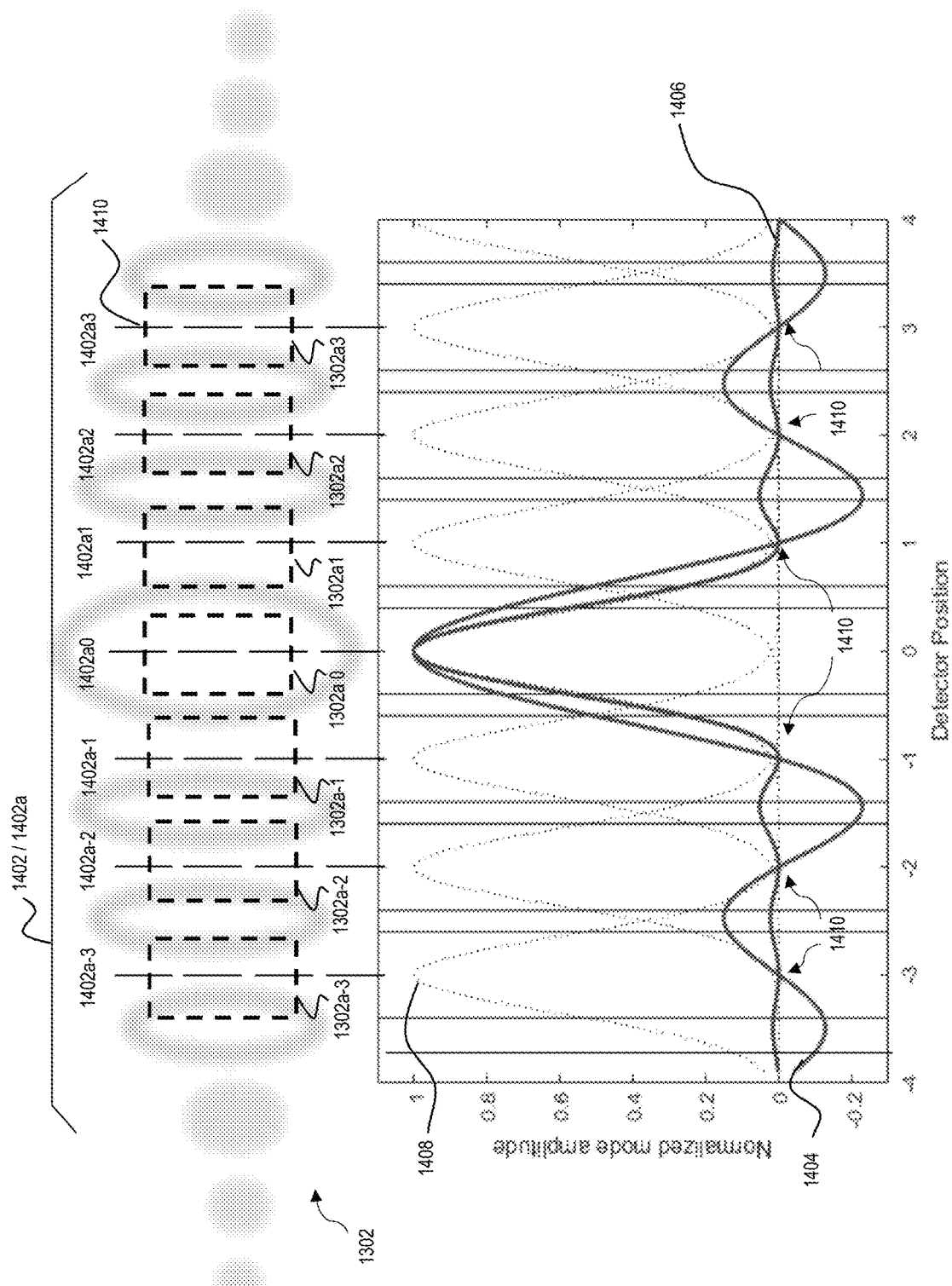
FIG. 10A is an illustration of RF emitter interference pattern in accordance with aspects of the invention.

FIG. 10A illustrates an exemplary RF emitter image 1402 formed as an RF emitter interference pattern 1402a. The RF emitter interference pattern 1402a corresponds to a portion of the larger interference pattern of the RF scene (that portion corresponding the RF emitter image resulting from the RF emitter) sensed by the antenna array 110 in the real world. The top portion of FIG. 10A shows the RF emitter interference pattern 1402a as projected onto an image plane (e.g., the plane of the paper of FIG. 10A) while the lower portion of FIG. 10A illustrates the varying optical field and power of the RF emitter interference pattern 1402a.

Specifically, as shown in the top portion of FIG. 10A, an RF emitter interference pattern 1402a is formed as a series of pattern elements ( . . . 1402a-3, 1402a-2, 1402a-1, 1042a0, 1402a1, 1402a2, 1402a3 . . . ) (each pattern element may be generically referenced as 1402ai). Each pattern elements 1402i has a varying intensity, with the highest (or peak) intensity located in the center of the pattern element 1402i with intensity constantly decreasing (e.g., left, right, up, down) from this center. The heat map representation of intensity in FIG. 10A is exaggerated for purposes of this discussion. In this example, each pattern element 1402ai is oblong and linearly extends the vertical direction (which may correspond to the vertical direction in the real-world RF scene) and has a similar shape as the other pattern elements 1402ai. However, other pattern element shapes (which may or may not be similar to one another) may be formed as part of an RF emitter interference pattern 1402a.

Each pattern element 1402ai has a center corresponding to a maximum intensity (and maximum power) of light. Note that because intensity corresponds to power/area, descriptions herein of power are equally applicable to intensity and vice versa. Pattern element 1402a0 has the strongest intensity of the RF emitter interference pattern 1402a while other pattern elements 1402ai besides 1402a0 have lesser intensities (and provide local maximums of intensity and power of the RF emitter image 1402).

The lower portion of FIG. 10A illustrates further details of the RF emitter image 1402 and its pattern 1402a. The lower portion 10A is aligned with the upper portion of FIG. 10A to show further detail of the pattern 1402a in the upper portion of FIG. 10A. The position of detectors edges are indicated by vertical black lines with the center positions (centerline of each detector) indicated by the tick marks located along the horizontal axis of FIG. 10A. Spacing between the detectors 1302i corresponds to spacing between the vertical black lines. The sensory array 1302 may be formed to capture and detect 80% or more of the optical image impinged thereon.

The lower portion of FIG. 10A illustrates properties of the RF interference pattern 1402a across an image plane of the optical processor 200 that coincides with the sensor array 1302. The plots shown in FIG. 10A depict the normalized optical field amplitude (represented by first curve 1404), optical power amplitude, i.e. the optical field amplitude squared (represented by second curve 1406) and corresponding to the intensity of the RF emitter interference pattern 1402a, and the Gaussian modes of lens-coupled fibers aligned to the same positions (e.g., centered at a corresponding tick mark) as the indicated detector positions (represented by dotted lines 1408).

The upper portion of FIG. 10A also illustrates detectors 1302a-4, 1302a-3, . . . 1302a4 (each generically referenced as 1302ai) of a sensor array 1302. In this exemplary embodiment, the positions of the detectors 1302a are positioned at an image plane of the optical processor 200 to capture the RF emitter image 1402. As shown in FIG. 10A, a detector 1302a0 is positioned to have the maximum optical field (1404) and optical power (1406) of the RF emitter image 1402 impinged thereon. Moreover, it will be appreciated that nulls 1410 of the optical field (1404) and the optical power (1406) are respectively located at the center of detectors 1302ai adjacent to detector 1302a0. The locations of these nulls 1410 are illustrated in the top portion of FIG. 10A by vertical dashed lines. Thus, the arrangement of the detectors 1302a of the sensor array 1302 is provided to correspond to the RF emitter interference pattern 1402a so that one detector (here 1302a0) arranged at the center of the RF emitter interference pattern has the highest intensity of the RF emitter image 1402 impinged thereon, while detectors 1302ai other than this one detector (e.g., 1302a0) are arranged at nulls 1410 to reduce (e.g., minimize) their sensitivity to and sensing of the RF emitter image 1402. It will also be appreciated that gaps between the detectors 1302i may have positions corresponding to the local maximums of the optical power 1406, reducing sensitivity of the sensor array 1302 to these local maximums.

It should be appreciated that the pattern of an RF emitter interference pattern 1402a is a function of the arrangement of the outputs 141 of the optical fibers 140. Thus, the RF emitter interference pattern 1402a, while being generated in response to an RF emitter by optical processor 200, may be a fixed pattern with respect to its generation in the optical image of the RF scene at the image plane (e.g., within the larger interference pattern). For example, the pattern of the interference pattern of the entire optical image formed at the image plane may only vary in intensity based on the presence or absence of one or more RF emitters responsible for generating corresponding RF emitter images 1402.

As an analogy, consider an optical mask (e.g., an opaque sheet with holes formed therein to form a pattern) and a flashlight shining light through the optical mask to form a light pattern on a wall. The flashlight (corresponding to an RF emitter) projecting through this optical mask may generate a pattern (corresponding to the RF emitter interference pattern) on the wall (corresponding to the image plane). Although the flashlight (RF emitter) is responsible for the generation of the pattern, the pattern itself is a function of the optical mask pattern in this analogy. Similarly, an RF emitter may be responsible for the generation of the RF emitter interference pattern and its location in the image of the RF scene (e.g., at the image plane of processor 200), but the pattern itself may be a function of the arrangement of the outputs 141 of the optical fibers 140. Movement of the flashlight to a different location may generate a different pattern at a different location on the wall—similarly, movement of the RF emitter to a different location may generate a different RF emitter interference pattern at a different location within the image of the RF scene. In addition, different RF emitters may generate the same RF emitter interference pattern at the same location within the image of the RF scene.

Thus, even when an RF emitter location does not result in the center of full RF emitter interference pattern 1402*a* to align with the center of a detector 1302*ai* of sensor array 1302, the peak intensity of the RF emitter interference pattern 1402*a* may still fall on the center of a detector 1302*ai* due to the fixed relationship between the interference pattern and the RF image. In this instance, the RF emitter interference pattern 1402*a* may be viewed as two of the RF emitter interference pattern shown in FIG. 10A (with same or different intensities), each one centered on a different detector (e.g., 1302*a*0 and 1302*a*1) that neighbor each other. FIG. 10A illustrates that, other than the central pattern element 1402*a*0 spot of an RF emitter interference pattern 1402*a* (position 0 in FIG. 10A), the optical field amplitude 1404 is largely antisymmetric for each of the other pattern elements 1402*ai* with respect to the detector 1302*i* on which it impinges (e.g., detectors 1302*i* other than detector 13020 receive light of a pattern element 1402*ai* that has an optical field that positive on one side of the detector 1302*i* and negative on the other side of the detector 1302*i*). Whereas the Gaussian fiber mode, represented by dotted curve 1404 is always symmetric. Hence, the product of the Gaussian fiber mode and the optical field amplitude at these detectors 1302*i* (other than detector 13020) is also largely antisymmetric, and therefore the overlap integral and resulting coupling efficiency can be made relatively small for all detector input positions except position 0. This result is based on the fact that only light that couples into the optical waveguide's particular fiber mode (e.g., single mode) can be detected. Therefore, there will be enhanced spatial isolation between an associated RF emitter's central pattern element (here, 1402*a*0) as detected by the corresponding detector (here 13020) and the detection of corresponding pattern elements 1402*ai* of the remaining detectors 1302*ai*. Since the squared field amplitude (represented by second curve 1406) is positive in all instances and largely symmetric with respect to the indicated detector positions, the response at positions other than position 0 will be greater than that of embodiments that include detectors 1302*a* using single mode optical fibers (or other single mode waveguides) to couple light captured at the image plane to photodetectors.

Figure 10B:
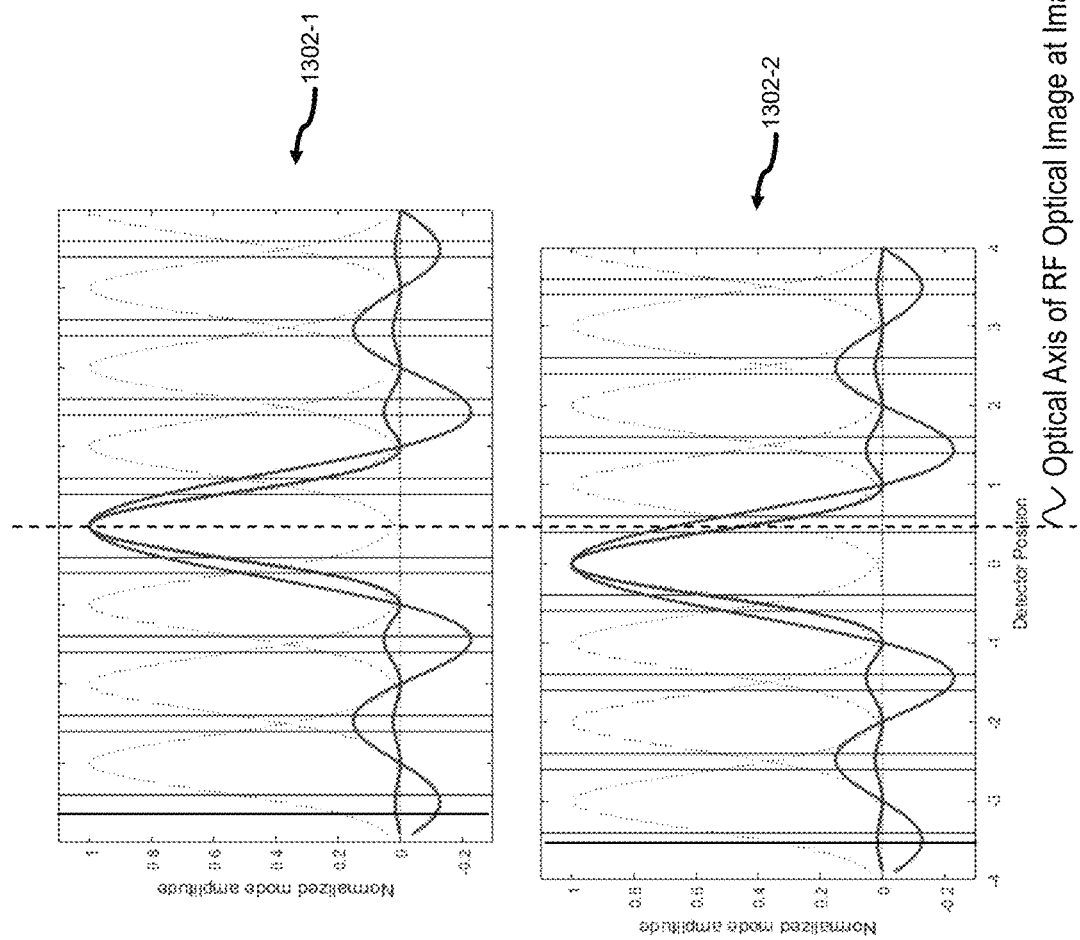
FIG. 10B is an illustration of first and second RF emitter interference patterns for in accordance with aspects of the invention.

FIG. 10B is an illustration that is similar to FIG. 10A, but with multiple sensor arrays that are offset with respect to an optical axis of the optical image of formed in an image plane of processor 200. For example, the embodiment of FIG. 1 may be implemented using two sensor arrays 1302, each at a location corresponding to photodetector 194. Each of the sensor arrays 1302 may be positioned at a corresponding image plane formed at their location (e.g., having an input face to capture and/or sense light of the optical image at the corresponding image plane). However, the different sensor arrays 1302 may be offset from one another (e.g., shifted in the image plane) with respect to an optical axis (or other shared optical location) of the image planes. For example, the second sensor array 1302 may be offset with respect to the optical axis and the first array by a distance equal to half of the pitch between detectors 1302*i*. In embodiments having three sensor arrays, the second and third arrays and may be offset with respect to the optical axis and the first array by ⅓ and ⅔ the pitch of detectors 1302*i*.

As noted, an RF emitter interference pattern 1402*a* may result in two of the RF emitter interference patterns shown in FIG. 10A (with same or different intensities), each one centered on a different detector (e.g., 1302*a*0 and 1302*a*1) that neighbor each other. Thus, by providing several sensor arrays 1302 that are offset with respect to the optical axis of the optical image, alignment of an RF emitter interference pattern 1402*a* (being a function of the location of the RF emitter in the RF scene in the real world) may be improved for at least one of the sensor arrays 1302.

In addition, the center of an RF emitter image 1402 may be steered by SLM phase shifters 196 (e.g., as described herein with respect to FIG. 1) to center the RF emitter image and emitter interference pattern 1402*a* onto a specific detector 1302*i* to achieve alignment shown in FIG. 10A. However, in some embodiments, there may be no need to use SLM phase shifter 196 (e.g., when the two sensor arrays are offset with respect to an RF emitter interference pattern 1402/the RF optical image as described herein).

Figure 10C:
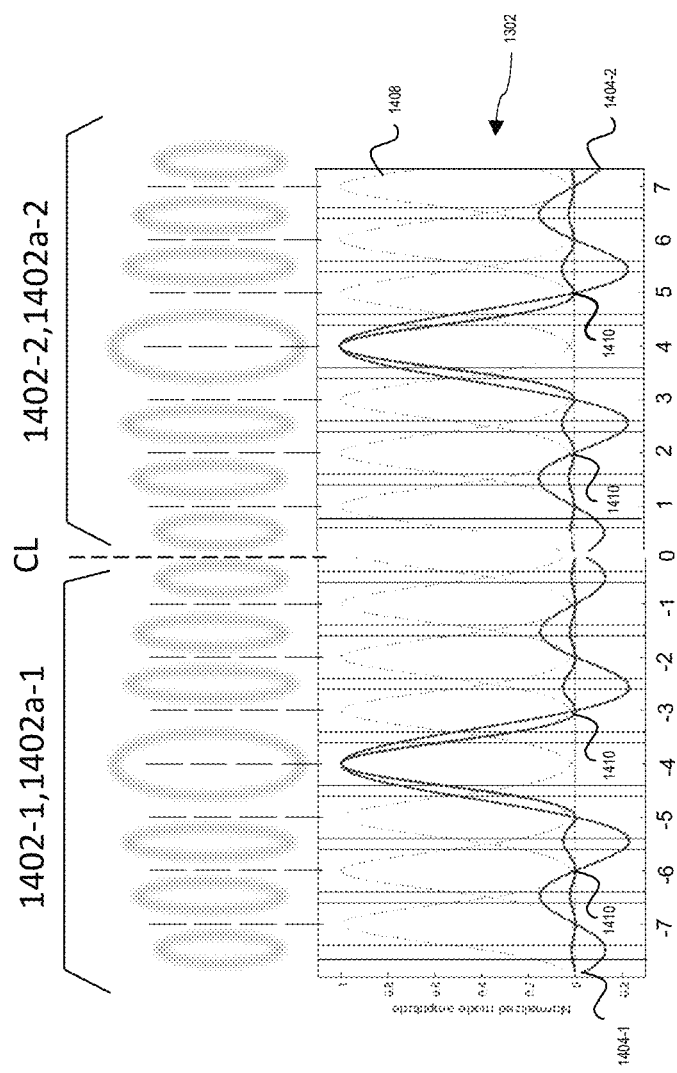
FIG. 10C is an illustration of first and second RF emitter interference patterns in accordance with aspects of the invention.

FIG. 10C illustrates multiple RF emitter images 1402-1, 1402-2 with corresponding RF emitter interference patterns 1402*a*-1, 1402*a*-2 distributed across a sensor array 1302. As can be appreciated, the same sensor array 1302 may simultaneously detect signals provided by multiple RF emitters (e.g., as described herein with respect to the RF signal extracted from the detector 1302*i* that receives the peak intensity/peak optical field (1404-1, 1404-2) of the corresponding RF emitter image 1402-1, 1402-2 (e.g. aligned with the central pattern element 1402*ai* of the corresponding RF emitter interference pattern 1402*a*-1, 1042*a*-2). Because detectors 1302*ai* neighboring the detector that receives the peak intensity/peak optical field receive little or an insignificant amount of optical energy RF emitter image 1402-1, 1402-2, these detectors 1302*ai* may be used to detect neighboring RF emitter images with no significant interference. Although FIG. 10B illustrates the centers of the RF emitter images 1402/RF emitter interference patterns 1402*a* spaced apart by several detectors 1302*ai*, immediately neighboring detectors 1302*ai* may be used to detect different RF emitter images (even though such RF emitter images 1402 and patterns 1402*a* may overlap).

Figure 11A:
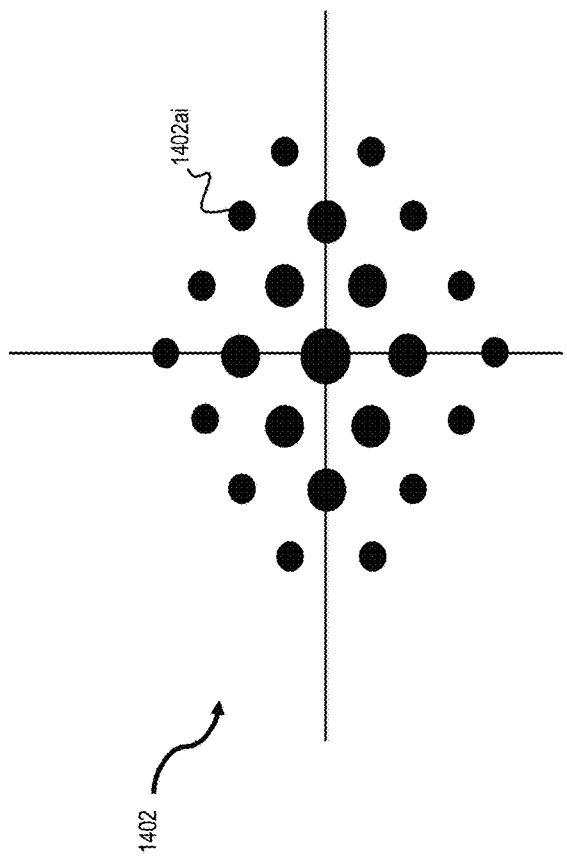
FIG. 11A is an illustration of an RF emitter interference pattern in accordance with aspects of the invention.
Figure 11B:
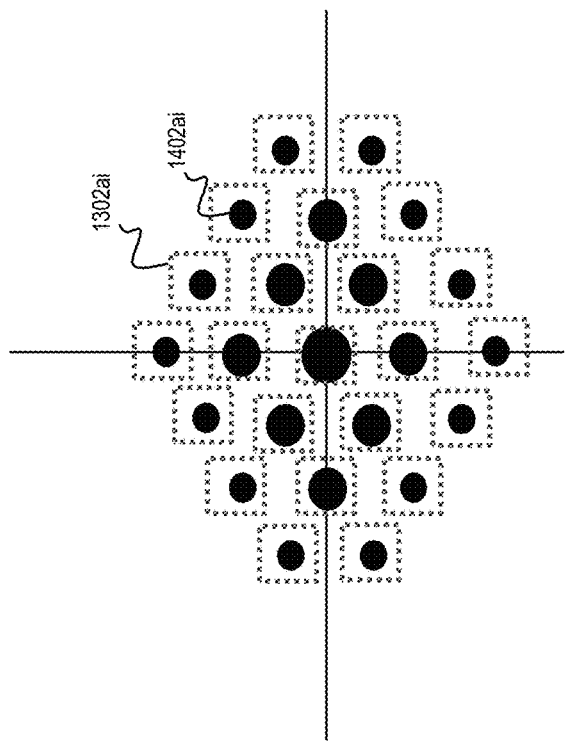
FIG. 11B is an illustration of an RF emitter interference pattern as projected on an array of discrete detectors of a sensor array in accordance with aspects of the invention.

It will be appreciated that the RF emitter interference patterns of FIGS. 10A-10B are exemplary. Other types of interference patterns may be generated by the RF emitters at the image plane of processor 200. Likewise, other arrangements of detectors and sensor arrays are suitable for these different types of interference patterns FIGS. 11A and 11B illustrate an alternative RF emitter interference pattern 1402*a*, showing portions of relatively high intensity forming a dot pattern on an image plane of the processor 200 (each dot representing a relatively high optical field and intensity). In this example, the dot pattern includes dots (or image dots) arranged in two dimensions across the image plane, however it is also possible for RF emitter interference pattern 1402a to be formed as dots 1402ai aligned in one dimension. FIG. 11A illustrates the image dots 1402ai (dark circles) on the image plane and FIG. 11B illustrates the image dots 1402ai on the image plane with the addition of the detectors 1302ai (broken line square cells) of a sensor array 1302. The optical field and the optical power/intensity may be the same as that described with respect to FIG. 10A with respect to a line extending through centers of the image dots of the interference pattern 1402a (e.g., for each of the linear arrangements of the dots 1402i left to right, up and down, and diagonally). Alternate sensor array 1302a embodiments may have detectors 1302ai located alternately depending on the RF emitter interference pattern 1402a formed by the processor 200 at the image plane.

The arrangement of the detectors 1302ai of the sensor array 1302 in correspondence to the RF emitter interference pattern (as described herein) may be implemented with any or all of the detectors described herein, such as with phase compensation detectors 175, cueing detector 190 and/or as detectors 194. For example, a sensor array 1302 as described above may be used for each of the detectors 194 of FIG. 1, providing two or more sensory arrays 1302 in the optical processor 200. The sensor array 1302 may be positioned within an image plane or other detection plane of the optical processor 200. For example, sensor array(s) 1302 may be positioned at locations corresponding to those described herein with respect to phase compensation detectors 175, cueing detector 190 and/or as detectors 194.

The sensor array 1302 may comprise the optical sensors described herein, such as those with respect to FIGS. 1 to 9. For example, optical sensors of an array of photodetectors, such as those described elsewhere herein (such as an array of photodiodes positioned at the image plane). In some examples, the sensor array 1302 may be an integrated circuit of a semiconductor chip, embodied as a charged coupled device (CCD) or contact image sensor or CMOS image sensor positioned at the image plane of processor 200 (with each pixel of corresponding to an individual sensor described herein). In other examples, the sensor array 1302 may comprise a lenslet array to capture the interference pattern at the image plane and transmit the same via optical fiber to photodetectors (e.g., photodiodes) for conversion to an electrical signal (exemplary detail described below).

Figure 12:
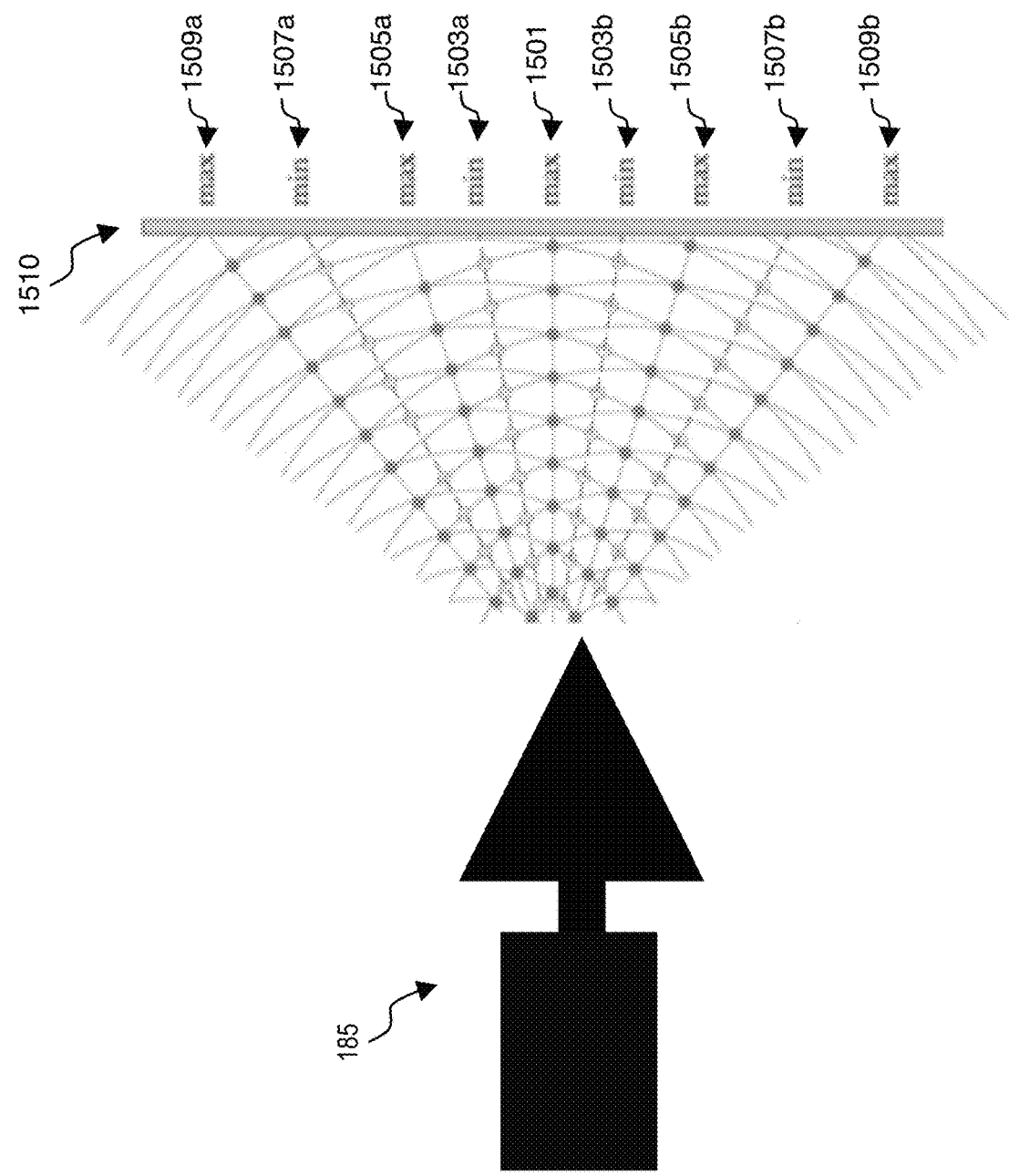
FIG. 12 is an illustration of an RF emitter pattern as projected on an image plane in accordance with aspects of the invention.

FIG. 12 is an exemplary illustration of the formation of local maximums and local minimums forming an RF emitter interference pattern 1402a on an image plane 1510 of the optical processor 200. As illustrated, the RF emitter interference pattern 1402a has varied intensity of light including a central maximum 1501, a plurality of local maximums 1505a, 1505b, 1509a, 1509b, and a plurality of local minimums 1503a, and 1507b. It will be appreciated that these local minimums of intensity may correspond to the nulls 1410 of FIG. 10A and that detectors 1302a of a sensor array 1302 may be as described herein.

Figure 13:
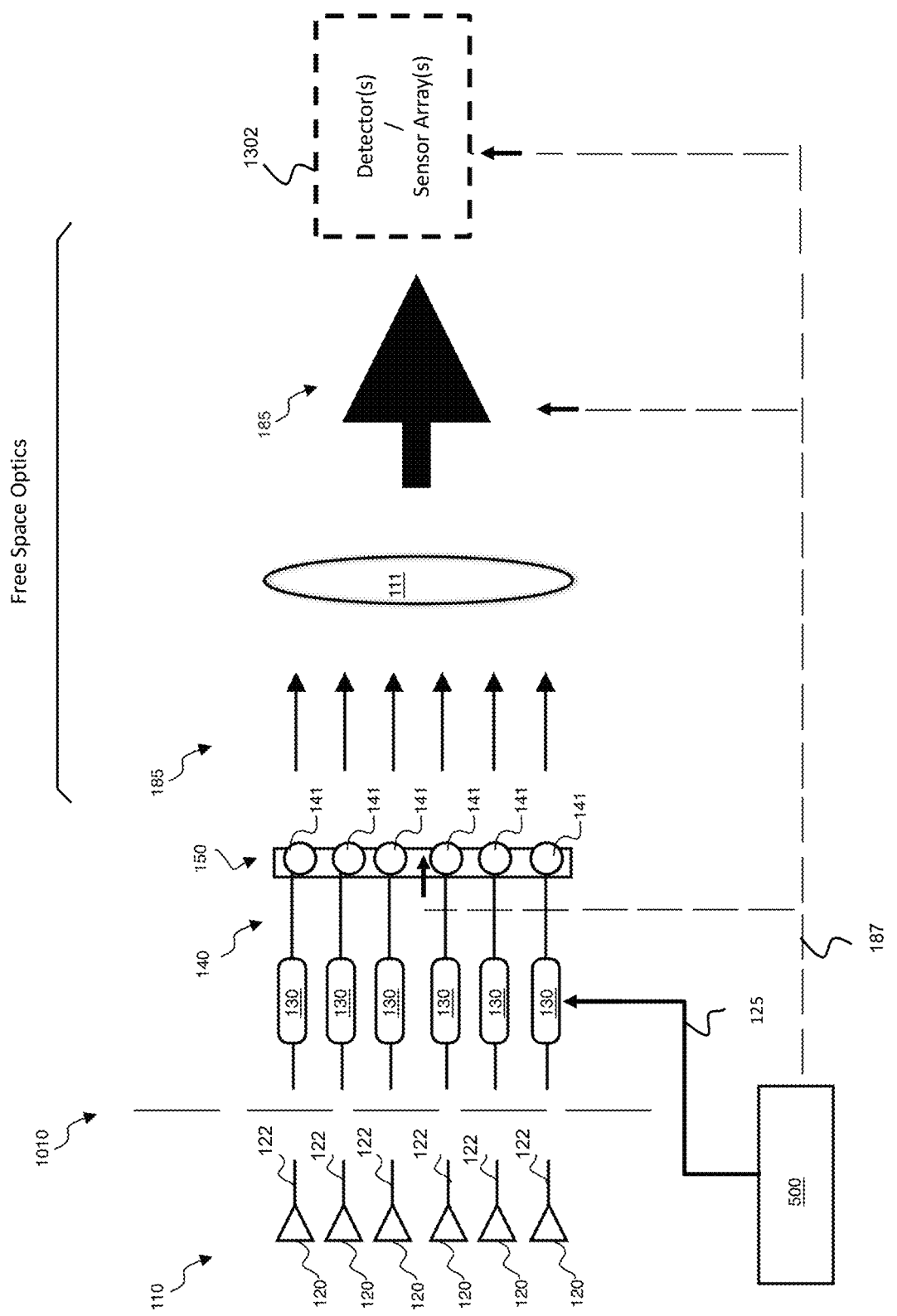
FIG. 13 is a block diagram of an RF receiver in accordance with aspects of the invention.

FIG. 13 is a block diagram of an imaging receiver including a sensor array 1302 and its detectors 1302a in accordance with the principles of FIGS. 10A-10C and the embodiments of FIGS. 1 to 9. With the exception of the novel sensor array 1302, the imaging receiver of FIG. 13 may be the same as described herein with respect to FIGS. 1-9. Repetitive description may be omitted. In this example, the phased array antenna 110 includes a plurality of antenna elements 120 that are respectively connected to a corresponding one of the electro optic modulators 130 via a plurality of RF transmission lines 122 through respective RF connectors (illustrated by dashed line 1010). The optional use of RF connectors 1010 may facilitate the reconfiguration of the imaging receiver so that the imaging receiver may be used with other antennas that operate at different RF carrier frequencies (i.e., e.g., antenna array 110 may be replaced with another antenna array by a user and the imaging receiver, using a new antenna array may operate using the same optical processor 200).

FIG. 13 also illustrates optical source 500 (e.g., of FIG. 8) configured to provide the optical carrier signal 125 and the reference optical signal 187.

FIG. 13 also illustrates options for providing the reference optical beam 187 to combine with beams 185 (illustrated by three branches of dashed lines 187). Only one of these options need be implemented in the imaging receiver. In the first branch, the reference beam 187 may be output into free space/interference space at a central location with respect to outputs 141. In the second branch, the reference beam 187 may combine with the beam 185 in free space/interference space after beams 185 merge into a combined beam (e.g., using a beam splitter/combiner 165 as shown in FIG. 1). In the third branch, the reference beam 187 may combine with beams 185 after they are captured by detectors 1302a at the image plane of processor 200 but prior to their conversion to an electrical signal by a photodetector.

Figure 14D:
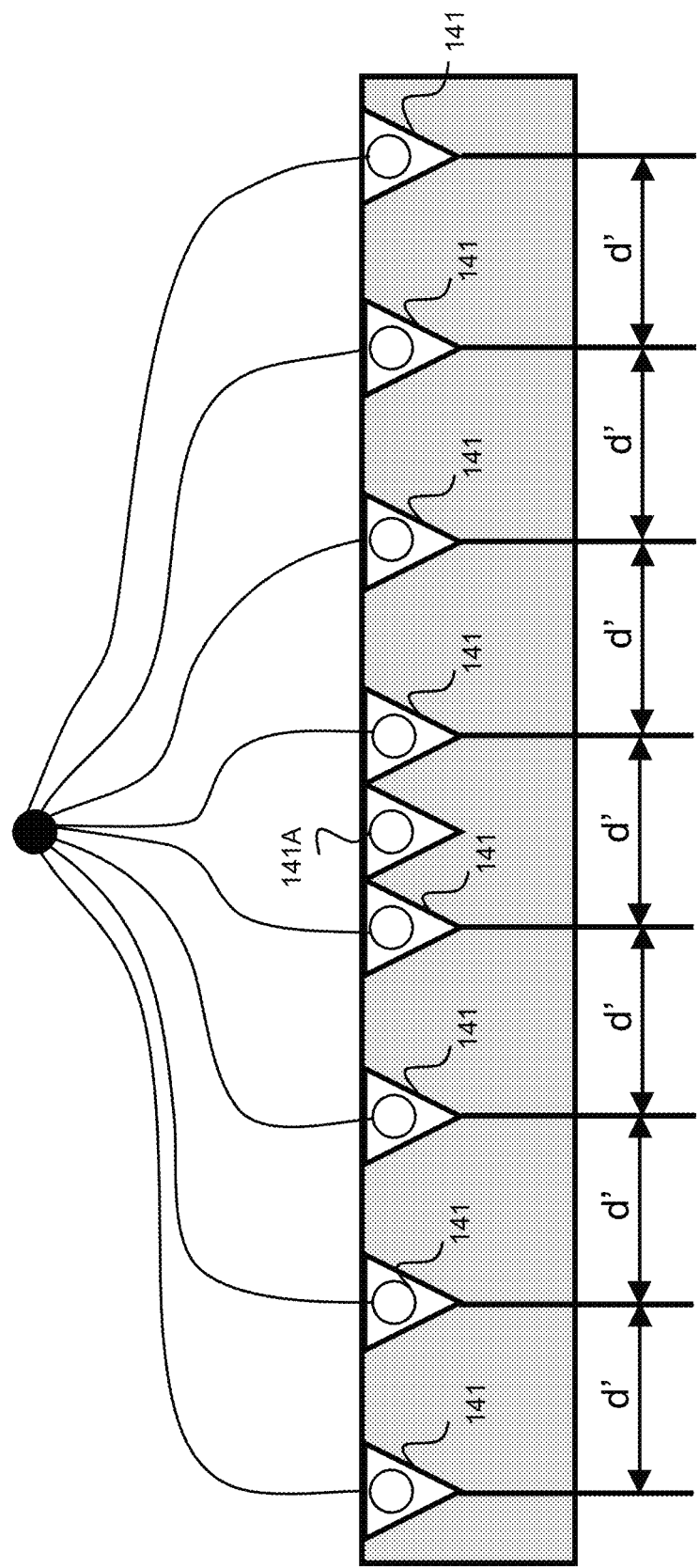
FIG. 14D is an illustration of an exemplary embodiment of a sensor array.

For embodiments covering the first branch, the reference beam 187 may be transmitted by an optical fiber having a corresponding output 141a that is centrally located with respect to each of the other outputs 141 (see FIG. 14D). In the exemplary embodiment, the outputs 141 are arranged in a first pattern or geometric arrangement that is symmetrical and has regular spacing at a pitch d' between the outputs 141. The first pattern may correspond to the arrangement of antenna elements 120.

The geometrical arrangement of the antennas 120 of the antenna array 110 may be geometrically similar to the geometrical arrangement of the outputs 141. As used herein, geometrically similar indicates similarity of arrangement and encompasses different scales. More precisely, geometrically similar arrangements can be obtained by uniformly scaling, possibly with additional translation, rotation and reflection.

Outputs 141 simultaneously project upconverted optical signals into an interference space 1021. At the same time, the optical source 500 projects an optical signal, such as a reference beam or reference optical signal into the interference space by output 141a (see FIG. 14D). The projected optical signals projecting from outputs 141 and 141a interfere with one another in the interference space 1021 and form a composite beam 160. The composite beam 160 has a corresponding RF emitter interference pattern 1402a (see FIGS. 10A-11B).

Embodiments implanting the second branch may correspond to that described with respect to FIG. 1, where reference beam 187 combines with composite beam 160 via beam splitters. For embodiments reflecting the third branch, the reference beam 187 may be provided directly to the sensor array 1302, such as merging with portions of composite beam 160 formed by beams 185 after being captured by lenslets 1024a (see FIG. 14C).

FIGS. 14A-14C illustrate three configurations of the sensor array 1302 that may be implemented with the imaging receiver 100. As illustrated in FIG. 14A, sensor array 1302 is formed as a plurality of photodetectors 1028, such as photodiodes, each photodetector 1028 corresponding to a detector 1302*a* of the sensor array 1302. The photodetectors 1028 may be arranged in an image plane of the optical processor 200. The photodetectors 1028 may be formed as part of the same integrated circuit on the same semiconductor chip or formed separately. Each of the photodetectors 1028 may generate an RF signal, such as described with respect to photodiodes 194 of FIG. 1, when a center of an RF emitter image 1402 impinges on the such photodiode 1028.

As illustrated in FIG. 14B, the sensor array 1302 comprises a plurality of detectors 1302*a*, each detector 1302*a* comprising a lenslet 1024*a*, an optical fiber 1024 and a photodetector 1028. The lenslets 1024*a* act as inputs for the detectors 1302*a* and are arranged in an image plane of the optical processor 200. Light captured by each of the lenslets 1024*a* is transmitted to a corresponding photodiode 1028 via a corresponding optical fiber 1024. The optical fibers 1024 may be single mode optical fibers. Other waveguides (which may or may not be single mode waveguides may be used rather than optical fibers 1024). Photodetectors 1028 may generate an RF signal, such as described with respect to photodiodes 194 of FIG. 1 when a center of an RF emitter image impinges on the corresponding lenslet 1024*a* to which it is connected and in optical communication.

FIG. 14C is an illustration of sensor array 1302 that is suitable for use with the imaging receiver 100. In the example of FIG. 14C, the reference optical signal 187 of the optical source 500 does not mix with the composite beam 160 in free space/interference space. In the exemplary embodiment of FIG. 14C, reference beam 187 is provided to an optical splitter 1201 configured to split the reference beam 187. Each split optical reference beam 187 is provided by respective optical waveguides 1024 to respective beam combiners 1203 that combine the received split optical reference beam 187 with portions of the composite beam 160 (formed of portions of interfering beams 185) captured by lenslet 1024*a*, which is then provided to a corresponding photodiode 1028 which generates a corresponding RF electrical signal (e.g., as discussed herein with respect to photodiodes 194).

Sensor arrays 1302 have the benefit of allowing the active device of the detectors 1302*a* (e.g., the photodetectors 1028) to be freely positioned without correspondence to the positions of detectors 1302*a* as described herein. Rather, positioning of detectors 1302*a* as described herein is achieved by the positions of lenslets 1024*a* at the image plane of the optical processor 200 (i.e., the positions of the detectors 1302*a* described herein with respect to the RF emitter image pattern 1402*a* corresponds to the position of the lenslets 1024*a* of detectors 1302*a*). Thus, structure of the photodetectors 1028 may be formed based on other design considerations, such as to maximize power conversion efficiency (from optical to electrical) and heat dissipation. For example, the photodetectors 1028 or other active devices of the detectors 1302*a* of the sensor 1302 array need not be formed integrally (e.g., as one semiconductor chip) but may each be separately formed (e.g., as separate semiconductor chips) or in groups (e.g., several semiconductor chips with each chip each comprising several photodetectors 1028).

The embodiments of FIGS. 14B and 14C, when implemented using single mode optical fibers, also help reduce unwanted signal detection of an RF emitter image 1402 by detectors 1302*ai* adjacent to the detector 1302*ai* positioned in the center of the RF emitter image 1402 (e.g., other than detector 1302*a*0 in FIG. 10A). The coupling efficiency into a single-mode optical waveguide, e.g., a single mode optical fiber, is dependent on the optical field amplitude's overlap with the optical waveguide's spatial mode profile. In these embodiments, the coupling efficiency is the square of the integral of the product of the field amplitude and the mode profile; notably, the squaring occurs after integrating. Consequently, distributions of the optical field amplitude that are antisymmetric with respect to the axis of the optical waveguide do not couple into the optical waveguide, and are therefore not detected (or reduced coupling leads to less detection).

As described with respect to FIG. 10A, the imaging receiver can be configured such that the field amplitude in the detection plane of the image plane is predominantly antisymmetric at all but one detector position in the image plane. This position may correspond to the center of the RF emitter image 1402 formed by the imaging receiver that corresponds to an RF emitter or RF source. At least one advantage of these exemplary embodiments is the improvement of the spatial isolation achieved between the optical image position and the other sensors/photodetector positions.

It will be appreciated that in the disclosed embodiments and illustrations herein, an antenna array may be regularly spaced and in one one-dimension, however, the concepts disclosed herein are extensible to higher dimensionality antenna arrays. Such higher dimensional antenna arrays may include: planar two-dimensional array(s), arrays arranged in several directions on a curved surface, or one dimensional arrays arranged on a curved line. It will be appreciated that the antennas in such arrays may be regularly spaced or otherwise. Likewise, the concepts disclosed herein are extensible to higher dimensionality sensor arrays 1302. Such higher dimensional sensor arrays may include: planar two-dimensional array(s), arrays arranged in several directions on a curved surface, or one dimensional arrays arranged on a curved line. It will be appreciated that the sensors in such arrays may be regularly spaced or otherwise.

FIG. 14D is an illustration of an exemplary arrangement of outputs 141. As shown in FIG. 14D, each of the outputs 141 are spaced apart from each adjacent output 141 by an equal distance. Furthermore, output 141A is centrally located relative to outputs 141. Each of outputs 141, (first optical ends) and output 141A are positioned within the same plane in three dimensional space, e.g., a transmission plane. In this way, outputs 141 are arranged in a first pattern in which all of outputs 141 are symmetrically distributed.

In the exemplary embodiment of FIG. 14D, the optical signal generated by reference beam 187 and transmitted into free space/interference space 1021 by output 141A is introduced symmetrically with respect to outputs 141. For example, for each output 141 there is another output 141 at a position that is symmetric about output 141A. The composite beam 160 mixed with the reference beam may form an optical beat signals at corresponding inputs to the detectors 1302*a*. Also, respective nulls may be stationary and aligned with sensor positions located at the image plane of the processor 200.

Figure 15A:
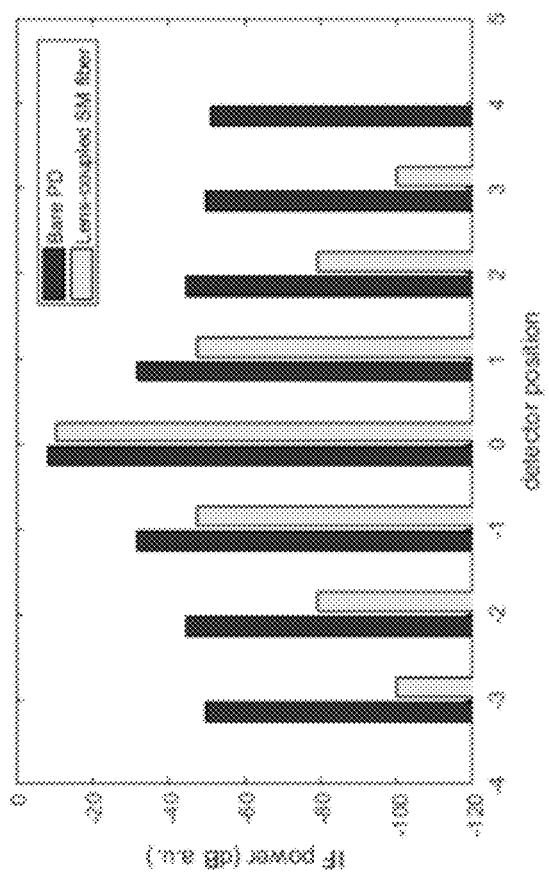
FIG. 15A is an illustration comparing the optical intensity as detected by the embodiments of FIG. 14A and FIG. 14B, respectively.

FIG. 15A is an illustration of the comparative optical intensity as detected by sensor arrays 1302 of only photodetectors (FIG. 14A) and sensory arrays 1302 including single mode optical waveguides that are coupled to detector inputs (e.g. lenslets 1024*a*) at an image plane and to detectors 1028. FIG. 15A depicts the calculated relative responses of embodiments having only photodetectors positioned directly in the detection plane and embodiments having detector inputs positioned directly in the detection plane that are coupled to single mode optical fibers. FIG. 15A compares the relative intensity/power captured by the detectors 1302*a* at the detector positions shown and described with respect to FIG. 10A. These results show that a greater degree of relative spatial isolation may be achieved when single mode optical fibers are used (as described with respect to FIGS. 14B and 14C) as compared to photodetectors only (as described with respect to FIG. 14A) (or as compared to detectors 1302a that do not use single mode fiber or other single mode waveguides).

Figure 15B:
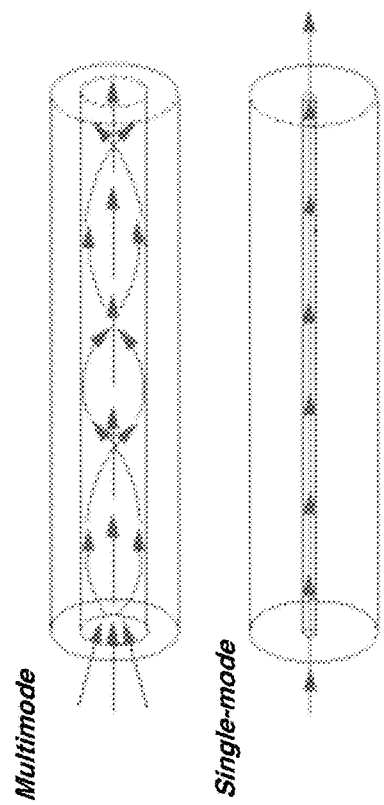
FIG. 15B is an illustration of multimode and single mode optical waveguides in accordance with aspects of the invention.

FIG. 15B is an illustration of multimode and single mode optical waveguides. Single mode optical waveguides, or single mode optical fibers, may be designed to only carry light directly down the optical waveguide in the transverse mode. An aspect of single-mode optical waveguides is that they can have waves with different frequencies, but of the same mode.

Figure 16:
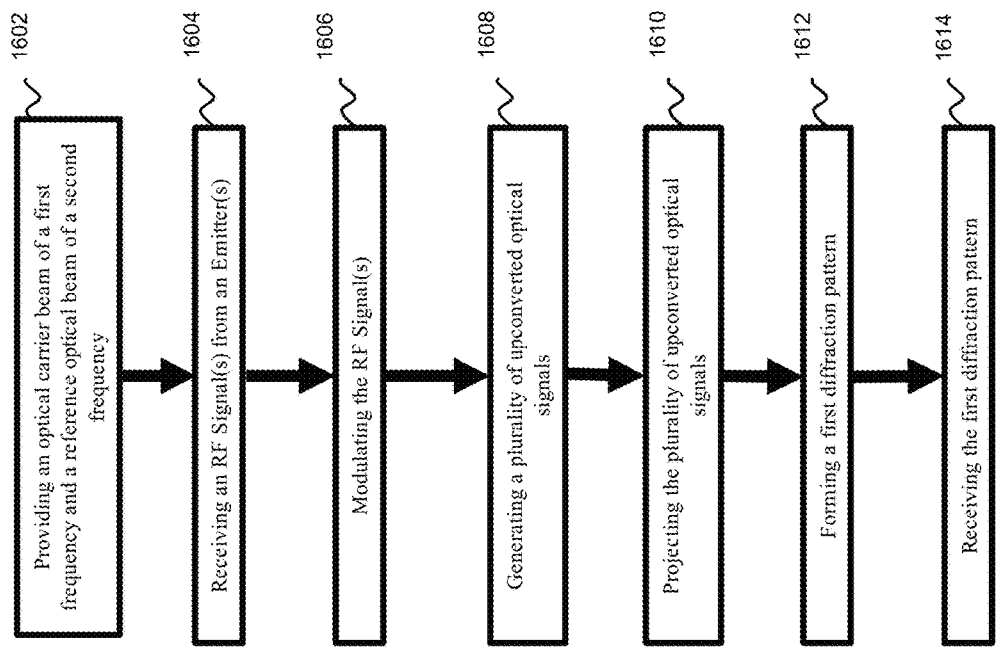
FIG. 16 shows a flow chart of a method for RF sampling in accordance with aspects of the invention.

FIG. 16 shows a flow chart of a method for RF sampling in accordance with aspects of the disclosure. At step 1602, an RF imaging receiver may provide an optical carrier beam of a first frequency and a reference optical beam of a second frequency. The frequency of the optical carrier beam and the frequency of the reference optical beam may differ by a set amount. At step 1604, the RF imaging receiver may receive an RF signal(s) from an emitter(s). Next, at step 1606 the RF signal(s) may be modulated, e.g., by an electro-optic modulator, to form a plurality of modulated signals. At step 1608 the plurality of modulated signals may be upconverted to a plurality of optical signals. At step 1610 the RF imaging receiver may project the plurality of upconverted optical signals. At step 1612, the plurality of projected and upconverted optical signals may interfere and form a first diffraction pattern (RF emitter patter). At step 1614, the first diffraction pattern (an RF emitter pattern) may be received, e.g., by a sensor array 1302.

It will be appreciated that while the optical waveguides described in the above embodiments are often optical fibers, other optical waveguides (e.g., single mode optical waveguides, single mode optical fibers) may be used other than multimode optical fibers. For example, in some embodiments, by utilizing lens-coupled single-mode optical fibers in the detection plane of an imaging receiver with heterodyne waveform recovery capability, enhanced isolation of spatially separated radio-frequency emitters can be achieved. In some embodiments, photodetectors themselves may be positioned in the image plane.

In exemplary embodiments, the imaging receiver can be configured such that the field amplitude in the image plane is predominantly antisymmetric at all but one detector position in the image plane. This position may correspond to the center of the optical RF emitter image formed by the imaging receiver that corresponds to an RF emitter or RF source detected by antenna array 110. At least one advantage of these exemplary embodiments is the improvement of the spatial isolation achieved between the optical image position and the other sensors/photodetector positions.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages of the inventive concepts. Accordingly, all such modifications are intended to be included within the scope of the present invention as defined in the claims.

What is claimed is:

1. A method of RF signal processing, the method comprising:
   providing an optical carrier beam of a first frequency and a reference optical beam of a second frequency, the first frequency and the second frequency differing by a set amount,
   receiving, at an array of antenna elements, one or more RF signals including a first RF signal from a first RF source, each antenna element generating an RF electrical signal in response thereto;
   for each RF electrical signal, generating a corresponding upconverted optical signal, the generating including modulating the optical carrier beam with the RF electrical signal, thus generating a plurality of upconverted optical signals;
   forming a first RF emitter interference pattern by transmitting the plurality of upconverted optical signals into an interference space to provide interference among the plurality of upconverted optical signals to generate a first RF emitter interference pattern corresponding to the first RF signal; and
   receiving by a sensor array, the first RF emitter interference pattern, sensors of the sensor array having a spatial separation that corresponds to the first RF emitter interference pattern, and the sensors of the sensor array comprising a plurality of lens-coupled single mode optical waveguides,
   wherein the reference optical beam is combined with the upconverted optical signals.

2. The method of claim 1, further comprising:
   combining the reference optical beam with the upconverted optical signals via beam combiners receiving the first RF emitter interference pattern via the single mode optical waveguides.

3. The method of claim 1, further comprising:
   combining the reference optical beam with the upconverted optical signals via a beam combiner within the interference space.

4. The method of claim 1, wherein a plurality of RF signals from corresponding RF sources are simultaneously received via the array of antenna elements and each RF signal forms a corresponding RF emitter interference pattern, each corresponding RF emitter interference pattern being simultaneously formed at a focal surface in which the sensor array is positioned and spatially separated from one another.

5. The method of claim 1, wherein the array of antenna elements are spatially arranged in a first pattern,
   wherein the plurality of upconverted optical signals are transmitted into the interference space from an end of a group of optical waveguides spatially arranged in a second pattern, and
   wherein the second pattern corresponds to the first pattern.

6. The method of claim 1, wherein each respective upconverted optical signal of the plurality of upconverted optical signals includes the optical carrier beam, a first sideband, and a second sideband, each of the first sideband and the second sideband corresponds to the RF electrical signal used to generate the respective upconverted optical signal.

7. The method of claim 6, further comprising:
   filtering at least one upconverted optical signal to isolate the first sideband or the second sideband.

8. The method of claim 1, wherein the first RF emitter interference pattern comprises variation in optical energy forming a plurality of local maximums of optical energy and a plurality of local minimums of optical energy, the local maximums being spatially separated from one another along a focal surface in which the sensor array is positioned and the local minimums being spatially separated from one another along the focal surface.

9. The method of claim 8,
wherein the plurality of upconverted optical signals are transmitted into the interference space from an end of a group of optical waveguides spatially arranged in a pattern, and
wherein the spatial separation of the plurality of local maximums of optical energy and the spatial separation of the plurality of local minimums of optical energy is a function of the pattern of the optical waveguides.

10. The method of claim 8, wherein at least one of the sensors of the sensor array is positioned at a local minimum of the first RF emitter interference pattern.

11. A method of RF signal processing, the method comprising:
receiving one or more RF signals from one or more RF sources at an array of antenna elements spatially arranged in a first pattern, each antenna element generating an RF electrical signal in response thereto;
for each RF electrical signal, modulating an optical carrier beam with the RF electrical signal to generate a corresponding upconverted optical signal;
receiving the upconverted optical signals at a first end of a transmission array comprising a group of optical waveguides;
transmitting, from a second end of the transmission array, the upconverted optical signals into an interference space in which the upconverted optical signals form a composite beam, the optical waveguides of the group being spatially arranged in a second pattern at the second end of the transmission array;
for each RF signal received from an RF source at the array of antenna elements, generating a corresponding RF emitter interference pattern at a focal surface; and
receiving by a sensor array, at least a first RF emitter interference pattern, the sensors of the sensor array comprising a plurality of lens-coupled single mode optical waveguides.

12. The method of claim 11, wherein the sensors of the sensor array have a spatial separation that corresponds to the first RF emitter interference pattern.

13. The method of claim 11, further comprising:
transmitting, in combination with upconverted optical signals, a reference optical beam into the interference space, and
wherein the optical carrier beam has a first frequency and the reference optical beam has a second frequency, the first frequency and second frequency differ by a set amount.

14. The method of claim 11, further comprising:
combining a reference optical beam with the upconverted optical signals via a beam combiner within the interference space, and
wherein the optical carrier beam has a first frequency and the reference optical beam has a second frequency, the first frequency and second frequency differ by a set amount.

15. The method of claim 11, further comprising:
combining a reference optical beam with the upconverted optical signals via beam combiners receiving the first RF emitter interference pattern via the single mode optical waveguides, and
wherein the optical carrier beam has a first frequency and the reference optical beam has a second frequency, the first frequency and second frequency differ by a set amount.

16. The method of claim 11, wherein the first RF emitter interference pattern at the focal surface comprises variation in optical energy of the composite beam forming a plurality of local maximums of optical energy and a plurality of local minimums of optical energy, the local maximums being spatially separated from one another along the focal surface and the local minimums being spatially separated from one another along the focal surface.

17. The method of claim 16, wherein the spatial separation of the plurality of local maximums of optical energy and the spatial separation of the plurality of local minimums of optical energy is a function of the second pattern.

18. The method of claim 16, wherein at least one of the sensors of the sensor array is positioned at a local minimum of the first RF emitter interference pattern.

19. The method of claim 11, wherein second pattern the optical waveguides of the group corresponds to the first pattern.

20. A method of RF signal processing, the method comprising:
providing an optical carrier beam of a first frequency and a reference optical beam of a second frequency, the first frequency and the second frequency differing by a set amount;
receiving a first RF signal from a first RF source at an array of antenna elements spatially arranged in a first pattern, each antenna element generating an RF electrical signal in response thereto;
for each RF electrical signal, modulating the optical carrier beam with the RF electrical signal to generate a corresponding upconverted optical signal;
receiving the upconverted optical signals at a first end of a transmission array comprising a group of optical waveguides;
transmitting, from a second end of the transmission array, the upconverted optical signals into an interference space in which the upconverted optical signals form a composite beam, the optical waveguides of the group being spatially arranged in a second pattern at the second end of the transmission array;
generating a first RF emitter interference pattern corresponding to the first RF signal at a focal surface; and
receiving the first RF emitter interference pattern by a sensor array, the sensors of the sensor array comprising a plurality of lens-coupled single mode optical waveguides.

21. The method of claim 20, further comprising:
combining the reference optical beam with the upconverted optical signals via beam combiners receiving the first RF emitter interference pattern via the single mode optical waveguides.

22. The method of claim 20, further comprising:
combining the reference optical beam with the upconverted optical signals via a beam combiner within the interference space.

23. The method of claim 20, further comprising:
generating a second RF emitter interference pattern at the focal surface corresponding to a second RF signal received by the array of antenna elements.

24. The method of claim 20, wherein the first RF emitter interference pattern at the focal surface comprises variation in optical energy of the composite beam forming a plurality of local maximums of optical energy and a plurality of local minimums of optical energy, the local maximums being spatially separated from one another along the focal surface and the local minimums being spatially separated from one another along the focal surface.

25. The method of claim 24, wherein the spatial separation of the plurality of local maximums of optical energy and the spatial separation of the plurality of local minimums of optical energy is a function of the second pattern.

26. The method of claim 24, wherein at least one of the sensors of the sensor array is positioned at a local minimum of the first RF emitter interference pattern.

27. The method of claim 20, wherein second pattern the optical waveguides of the group corresponds to the first pattern.

* * * * *